United States Patent
Kim et al.

(10) Patent No.: US 11,770,798 B2
(45) Date of Patent: Sep. 26, 2023

(54) SURVEILLANCE METHOD AND APPARATUS

(71) Applicant: HANWHA TECHWIN CO., LTD., Seongnam-si (KR)

(72) Inventors: Jimin Kim, Suwon-si (KR); Kiyong Jeon, Seongnam-si (KR)

(73) Assignee: HANWHA TECHWIN CO., LTD., Seongnam-si (KR)

( * ) Notice: Subject to any disclaimer, the term of this patent is extended or adjusted under 35 U.S.C. 154(b) by 420 days.

(21) Appl. No.: 16/421,948

(22) Filed: May 24, 2019

(65) Prior Publication Data

US 2019/0289575 A1 Sep. 19, 2019

Related U.S. Application Data

(63) Continuation of application No. 15/366,564, filed on Dec. 1, 2016, now Pat. No. 10,313,585, and a
(Continued)

(30) Foreign Application Priority Data

Mar. 27, 2015 (KR) .................. 10-2015-0043301
Dec. 3, 2015 (KR) .................. 10-2015-0171433

(51) Int. Cl.
  *H04W 72/02* (2009.01)
  *H04W 84/12* (2009.01)
(52) U.S. Cl.
  CPC ............ *H04W 72/02* (2013.01); *H04W 84/12* (2013.01)

(58) Field of Classification Search
  CPC . H04W 72/02; H04W 84/12; H04W 36/0069; H04W 36/28; H04W 76/15;
  (Continued)

(56) References Cited

U.S. PATENT DOCUMENTS 7,079,568 B1  7/2006  Boetzel et al.
7,131,136 B2  10/2006  Monroe
(Continued)

FOREIGN PATENT DOCUMENTS

CN  102246585 A  11/2011
CN  103039102 A  4/2013
(Continued)

OTHER PUBLICATIONS

Lee,"IP Camera Operating System to reduce Filming Blank and Reducing Method of Checking Time of Film", KR, KR 10-1455732, Oct. 28, 2014, English machine language translation (Year: 2014).*
(Continued)

*Primary Examiner* — Michael K Phillips
(74) *Attorney, Agent, or Firm* — Sughrue Mion, PLLC

(57) ABSTRACT

A surveillance method performed by a surveillance apparatus is provided. The surveillance method includes determining whether an event has occurred based on detection data; in response to determining that the event has occurred based on the detection data, transmitting a first wireless communication to an outside of the surveillance apparatus by using a second communicator at a second frequency and switching a power-off state of a first communicator to a power-on state; and transmitting a second wireless communication, corresponding to the event, to the outside by using the first communicator at a first frequency higher than the second frequency.

22 Claims, 16 Drawing Sheets

Related U.S. Application Data continuation of application No. 14/979,955, filed on Dec. 28, 2015, now Pat. No. 10,306,595.

(58) Field of Classification Search
CPC ..... H04W 88/06; H04W 88/10; H04W 52/50; H04W 52/028; H04W 72/0453; G08B 25/10; G08B 13/1966; G08B 13/19695; G08B 13/19697; H04N 5/23206; H04N 5/23203; H04N 7/183; H04N 7/181; H04N 5/23241; H04N 7/188; H04N 1/00315; Y02D 30/70

See application file for complete search history.

(56) References Cited

U.S. PATENT DOCUMENTS

| | | | |
|---|---|---|---|
| 8,335,204 B2 | 12/2012 | Samarasooriya et al. | |
| 8,442,016 B1* | 5/2013 | Lee | H04W 72/1215 370/338 |
| 8,787,907 B2 | 7/2014 | Jain et al. | |
| 8,958,456 B2 | 2/2015 | Nagai | |
| 9,008,150 B2 | 4/2015 | Lee et al. | |
| 9,282,297 B2 | 3/2016 | Siann et al. | |
| 9,832,379 B1* | 11/2017 | Neglur | H04N 5/3698 |
| 2002/0175820 A1 | 11/2002 | Oja et al. | |
| 2003/0107655 A1 | 6/2003 | Ishikazaka et al. | |
| 2003/0128130 A1 | 7/2003 | Kao | |
| 2004/0130624 A1* | 7/2004 | Ryley | G08B 13/19621 348/155 |
| 2004/0169733 A1 | 9/2004 | Ishizaka et al. | |
| 2006/0209176 A1* | 9/2006 | Nakamura | G08B 25/10 348/143 |
| 2006/0285579 A1 | 12/2006 | Rhee et al. | |
| 2008/0122938 A1 | 5/2008 | Broberg et al. | |
| 2009/0003273 A1* | 1/2009 | Tien | H04W 88/10 370/329 |
| 2009/0111496 A1 | 4/2009 | Ibrahim et al. | |
| 2010/0141762 A1* | 6/2010 | Siann | H04N 5/23241 348/143 |
| 2012/0076173 A1 | 3/2012 | Chang et al. | |
| 2013/0130739 A1 | 5/2013 | Kawakita et al. | |
| 2013/0163642 A1 | 6/2013 | Kizu et al. | |
| 2013/0235905 A1 | 9/2013 | Serizawa et al. | |
| 2013/0252553 A1 | 9/2013 | Hyon et al. | |
| 2013/0308685 A1 | 11/2013 | Nagai | |
| 2014/0019786 A1* | 1/2014 | Green | G06F 1/325 713/320 |
| 2014/0080427 A1 | 3/2014 | Babitch | |
| 2014/0348124 A1 | 11/2014 | Hasegawa et al. | |
| 2015/0130935 A1 | 5/2015 | Siann et al. | |
| 2016/0105644 A1* | 4/2016 | Smith | H04N 5/23206 348/159 |
| 2017/0105176 A1* | 4/2017 | Finnegan | H04W 52/0229 |
| 2017/0154326 A1* | 6/2017 | Jo | H04W 88/02 |
| 2017/0196044 A1* | 7/2017 | Nord | H04W 52/0258 |
| 2017/0295545 A1* | 10/2017 | Zacchio | H04W 88/06 |
| 2017/0301201 A1 | 10/2017 | Siann et al. | |

FOREIGN PATENT DOCUMENTS

| | | | | |
|---|---|---|---|---|
| CN | 103385016 A | 11/2013 | | |
| EP | 2273828 A1 * | 1/2011 | ........ | H04W 12/0608 |
| JP | 2003-501862 A | 1/2003 | | |
| JP | 2008-172556 A | 7/2008 | | |
| KR | 10-2006-0098179 A | 9/2006 | | |
| KR | 10-2009-0112979 A | 10/2009 | | |
| KR | 10-2012-0060016 A | 6/2012 | | |
| KR | 10-2012-0130110 A | 11/2012 | | |
| KR | 10-1455732 B1 | 10/2014 | | |
| KR | 10-1540447 B1 | 7/2015 | | |

OTHER PUBLICATIONS

Song, "Graphic Remote Control Device, System and Method having a plurality of Wireless Communication Module", KR, KR 10-1540447, Jul. 30, 2015, English machine language translation (Year: 2015).*

Park, "Low-Power Consumption Wireless Camera System with motion detection function", KR, KR 2009-0112979, Oct. 29, 2009, English machine language translation (Year: 2009).*

Benini et al., "Benefits of Wake-Up Radio in Energy-Efficient Multimodal Surveillance Wireless Sensor Network", Sep. 2014, IEEE, IEEE Sensors Journal, vol. 14, No. 9, pp. 3210-3220 (Year: 2014).*

Sifuentes et al., "Wireless Magnetic Sensor Node for Vehicle Detection With Optical Wake-Up", Aug. 2011, IEEE Sensors Journal, vol. 11, No. 8, pp. 1669-1676 (Year: 2011).*

Sifuentes et al., "Direct interface circuit to linearise resistive sensor bridge", Sep. 2008, Sensor and Actuators: Physical, pp. 210-215 (Year: 2008).*

Hidesato, et al., "Compound radio equipment and interference avoidance control method to be used therefor", Jul. 24, 2008, JP, JP 2008172556 (English translation).

FCC, Modifications of Parts 2 and 15 of the Commission's Rules for unlicensed devices and equipment approval, FCC, Jul. 12, 2004, FCC-04-165.

Communication dated Sep. 23, 2020 issued by the State Intellectual Property Office of P.R. China in counterpart Chinese Application No. 201610147673.9.

Communication dated Jul. 13, 2021 by the Korean Intellectual Property Office in counterpart Korean Patent Application No. 10-2015-0171433.

\* cited by examiner

H = {CANDIDATE CHANNELS HAVING LOWEST
    VALUE OF RECEIVED SIGNAL STRENGTH}
 OR
H = {3, 11, 27, 35, 45}
 OR
H = {5, 21, 28, 38, 46}
 OR
H = {9, 24, 31, 41, 47}

SURVEILLANCE METHOD AND APPARATUS

CROSS-REFERENCE TO THE RELATED APPLICATIONS

This application is a continuation of U.S. application Ser. No. 15/366,564, which claims priority to Korean Patent Application No. 10-2015-0171433, filed on Dec. 3, 2015, and U.S. application Ser. No. 14/979,955, which claims priority to Korean Patent Application No. 10-2015-0043301, filed on Mar. 27, 2015, in the Korean Intellectual Property Office, the disclosures of which are herein incorporated by reference in their entireties.

BACKGROUND

1. Field

Apparatuses and methods consistent with exemplary embodiments relate to surveillance, and more particularly to, a surveillance apparatus which is connected to an external apparatus through a plurality of communicators to perform surveillance. Apparatuses and methods consistent with exemplary embodiments also relate to selecting hopping target channels for a device which is disposed in a network such as a wireless local area network (WLAN) but does not use the network.

2. Description of the Related Art

Many surveillance cameras are installed in an increasing number of places, and techniques for detecting an occurrence of an event from an image acquired by a surveillance camera and recording and storing the event have been developed.

The surveillance cameras are connected to an external power source by cable to receive power from the external power source, and also data acquired from the surveillance cameras is transferred to an external apparatus by wire.

Recently, as the number of installed surveillance cameras increases, an associated apparatus cannot be connected to all of the surveillance cameras by wire. Thus, many surveillance cameras have built-in batteries and transmit images wirelessly to perform surveillance. However, such surveillance cameras need frequent maintenance due to limited performance of the built-in batteries.

SUMMARY

One or more exemplary embodiments provide a surveillance apparatus capable of efficiently handling power by including a communicator configured to transmit or receive a large volume of data at high speed and a communicator configured to transmit or receive a small volume of data with low power.

One or more exemplary embodiments provide a surveillance apparatus that may minimize power consumption by temporarily supplying power only to an element associated with a corresponding interrupt when an interrupt is detected.

Various aspects of the inventive concept will be set forth in part in the description which follows and, in part, will be apparent from the description, or may be learned by practice of the presented exemplary embodiments.

According to one or more exemplary embodiments, a surveillance method performed by a surveillance apparatus is provided, including determining whether an event has occurred based on detection data; in response to determining that the event has occurred based on the detection data, transmitting a first wireless communication to an outside of the surveillance apparatus by using a second communicator at a second frequency and switching a power-off state of a first communicator to a power-on state; and transmitting a second wireless communication, corresponding to the event, to the outside by using the first communicator at a first frequency higher than the second frequency.

According to one or more exemplary embodiments, a surveillance method may include: an interrupt processing operation of determining whether an interrupt is generated and determining a type of the interrupt; a type-1 interrupt processing operation of, in response to determining that the interrupt is a type-1 interrupt, determining whether an event has occurred, and, in response to determining that the event has occurred, sending an event occurrence alarm to an outside of the surveillance apparatus using a second communicator, which transmits or receives data at a second frequency, and sending an image, corresponding to the event, acquired by an image sensor to the outside using a first communicator, which transmits or receives data at a first frequency higher than the second frequency; and a type-2 interrupt processing operation of, in response to determining that the interrupt is a type-2 interrupt, controlling the surveillance apparatus according to control information included in the type-2 interrupt, wherein the type-1 interrupt is an interrupt generated at a predetermined time interval.

According to one or more exemplary embodiments, a surveillance apparatus may include: a first communicator configured to transmit or receive data to or from an outside of the surveillance apparatus at a first frequency; a second communicator configured to transmit or receive data to or from the outside of the surveillance apparatus at a second frequency lower than the first frequency; a timer configured to periodically generate a type-1 interrupt; and a controller configured to control transmission or reception of the data through the first communicator and the second communicator and detect the interrupt, wherein the controller determines whether an event has occurred in response to the controller detecting the type-1 interrupt generated by the timer, and, in response to determining that the event has occurred, sends an event occurrence alarm to the outside through the second communicator and sends an image, corresponding to the event, acquired by an image sensor to the outside through the first communicator, and wherein in response to the controller detecting a type-2 interrupt generated, the controller controls operation of at least one of the first communicator, the second communicator, the image sensor, and at least one detector configured to detect a physical quantity or the event, according to control information included in the type-2 interrupt.

The exemplary embodiments of the inventive concept provide a method of selecting hopping target channels at a device which is included in a network such as a wireless local area network (WLAN) but does not use the network in order to minimize a probability that communication of the device does not function temporarily, and an apparatus to perform the method.

Various aspects of the exemplary embodiments will be set forth in part in the description which follows and, in part, will be apparent from the description, or may be learned by practice of the presented embodiments.

According to one or more exemplary embodiments, there is provided a method of selecting hopping target channels for a device which is included in a network but does not use the network. The method may include: selecting a plurality of candidate channels from among a plurality of channels included in an available frequency band of the network; classifying the candidate channels into a plurality of frequency regions based on a channel frequency of each of the candidate channels; and selecting at least one candidate channel as a hopping target channel from each of the frequency regions. Here, the network may be a WLAN, and the device which included in the network but does not use the network may be a monitoring or surveillance camera.

The available frequency band may be a frequency band of the WLAN.

The available frequency band may be a band ranging from about 2.4 to about 2.4835 GHz for the WLAN.

Each of the candidate channels may have a received signal strength less than a threshold signal strength.

The candidate channels may include channels which are reselected after the threshold signal strength is increased from a previous threshold signal strength in response to a number of candidate channels, each having a received signal strength, is less than a predetermined number of channels.

The hopping target channel selected from each of the frequency regions may include a channel having a lowest received signal strength in each of the frequency regions.

The classifying the candidate channels may include: sorting the candidate channels in ascending order or descending order according to the channel frequency of each of the candidate channels; and classifying the candidate channels such that at least one candidate channel included in each of the frequency regions is sorted in ascending order or descending order.

The hopping target channel selected from each of the frequency regions may include a channel having a lowest, intermediate, or highest frequency in each of the frequency regions.

The hopping target channels may include two most frequency-distant channels selected from two subsequent frequency regions among the frequency regions.

According to another exemplary embodiment, there is provided a channel-selecting apparatus for a device which is included in a network but does not use the network. The apparatus may include: at least one processor configured to implement: a candidate channel selector which determines a plurality of available channels available in the network; and a target channel selector which selects a plurality of frequency hopping channels from among the available channels such that any two of the selected frequency hopping channels are separated by a predetermined frequency difference or more.

According to one or more exemplary embodiments, there is provided another channel-selecting apparatus for a device which is included in a network but does not use the network. The apparatus may include: at least one processor configured to implement: a candidate channel selector which selects a plurality of candidate channels from among a plurality of channels included in an available frequency band of the network; a candidate channel classifier which classifies the candidate channels into a plurality of frequency regions based on a channel frequency of each of the candidate channels; and an target channel selector which selects at least one candidate channel as a hopping target channel from each of the frequency regions.

The available frequency band may be a frequency band of a WLAN and the device may be a monitoring camera or a surveillance camera.

The available frequency band may be a band ranging from about 2.4 to about 2.4835 GHz for the WLAN.

The candidate channel selector may select each of the candidate channels which has a received signal strength less than a threshold signal strength.

The candidate channels may be channels which are reselected by the candidate channel selector after the threshold signal strength is increased from a previous threshold signal strength in response to a number of candidate channels, each having a received signal strength, is less than a predetermined number of channels.

The hopping target channel selected by the target channel selector from each of the frequency regions may be a channel having a lowest received signal strength in each of the frequency regions.

The processor may further implement: a sorting unit which sorts the candidate channels in ascending order or descending order according to the channel frequency of each of the candidate channels, wherein the candidate channel classifier classifies the candidate channels such that at least one candidate channel included in each of the frequency regions is sorted in ascending order or descending order.

The hopping target channel selected by the target channel selector from each of the frequency regions may be a channel having a lowest, intermediate, or highest frequency in each of the frequency regions.

The hopping target channels may include two most frequency-distant channels selected from two subsequent frequency regions among the frequency regions.

The apparatus may be included in the device.

According to a method and an apparatus for selecting hopping object channels in accordance with exemplary embodiments, the candidate channels having a received signal strength less than the threshold signal strength are selected first. Therefore, the candidate channels selected first have a low probability of being interfered compared with other channels.

Also, the candidate channels are classified for each frequency region depending on a channel frequency, and one candidate channel is selected as a hopping target channel for the each frequency region. Therefore, the candidate channels may maintain a maximum frequency interval or frequency difference. In the case where a WLAN device newly or additionally operates while a non-WLAN device communicates with an external apparatus, a probability that the hopping target channels used by the non-WLAN device are interfered may be reduced. That is, a probability that communication of the non-WLAN device does not work may be reduced.

BRIEF DESCRIPTION OF THE DRAWINGS

These and/or other aspects will become apparent and more readily appreciated from the following description of the exemplary embodiments, taken in conjunction with the accompanying drawings, in which:

FIG. 15 is a view for explaining operations S205 to S207 of FIG. 14 by using an example.

DETAILED DESCRIPTION

Figure 1:
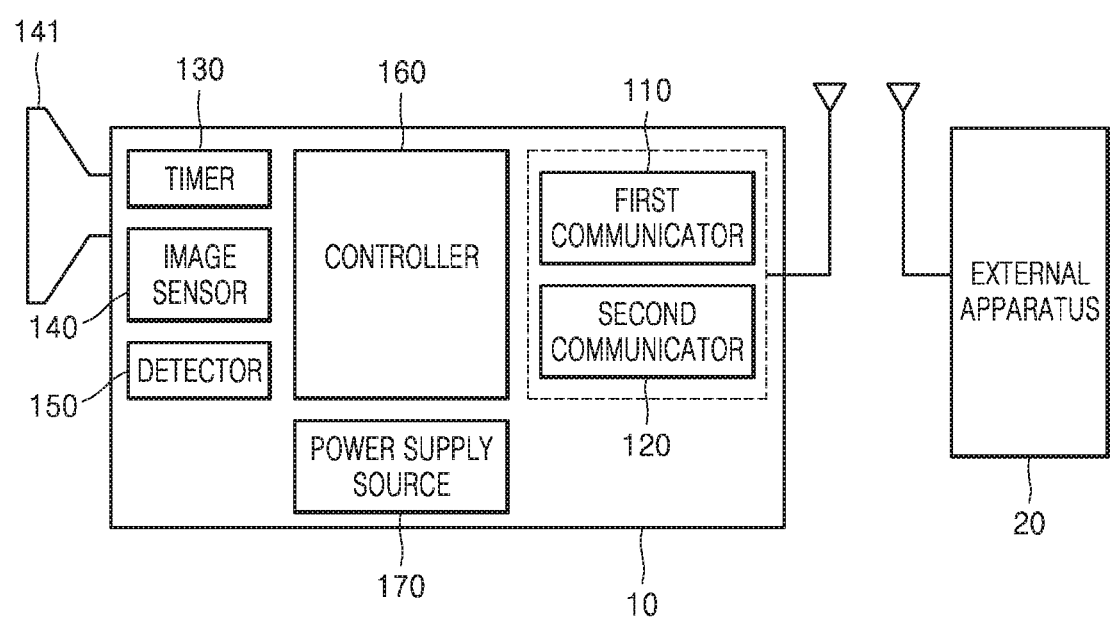
FIG. 1 schematically shows a surveillance system according to an exemplary embodiment.

Reference will now be made in detail to exemplary embodiments which are illustrated in the accompanying drawings, wherein like reference numerals refer to like elements (units, modules or components) throughout. In this regard, the exemplary embodiments may have different forms and is not to be construed as being limited to the descriptions set forth herein. Accordingly, the exemplary embodiments are merely described below with reference to the figures, to explain aspects of the inventive concept. As used herein, the term "and/or" includes any and all combinations of one or more of the associated listed items. Expressions such as "at least one of," when preceding a list of elements, modify the entire list of elements and do not modify the individual elements of the list.

As the inventive concept allows for various changes and numerous embodiments, particular exemplary embodiments are illustrated in the drawings and will be described in detail in the detailed description. It should be understood, however, that it is not intended to limit the inventive concept to particular exemplary embodiments, but rather, the disclosure is intended to cover all modifications, equivalents, and alternatives falling within the spirit and scope of the inventive concept as defined by the claims and their equivalents. Moreover, detailed descriptions related to well-known techniques are omitted when it is deemed that they may unnecessarily obscure the essence of the inventive concept.

Relational terms such as first, second, and the like may be used for describing various elements, but the elements should not be limited by the terms. These terms are used only to distinguish one element from another.

The terms used herein are merely used to describe particular exemplary embodiments, and are not intended to limit the inventive concept. The singular forms "a," "an," and "the" are intended to include the plural forms as well, unless the context clearly indicates otherwise. In the present specification, it is to be understood that the terms such as "including," "having," and "comprising" are intended to indicate the existence of the features, numbers, operations, actions, components, parts, or combinations thereof disclosed in the specification, and are not intended to preclude the possibility that one or more other features, numbers, operations, actions, components, parts, or combinations thereof may exist or may be added.

Exemplary embodiments of the inventive concept may be described in terms of functional block components and various processing operations. Such functional blocks may be realized by any number of hardware and/or software components configured to perform the specified functions. For example, the exemplary embodiments may employ various integrated circuit (IC) components, e.g., memory elements, processing elements, logic elements, look-up tables, and the like, which may carry out a variety of functions under the control of one or more microprocessors or other control devices. Similarly, where the elements of the exemplary embodiments are implemented using software programming or software elements, the inventive concept may be implemented with any programming or scripting language such as C, C++, Java, assembler, or the like, with the various algorithms being implemented with any combination of data structures, objects, processes, routines or other programming elements. Functional aspects may be implemented in algorithms that execute on one or more processors. Furthermore, the exemplary embodiments could employ any number of conventional techniques for electronics configuration, signal processing and/or control, data processing and the like. The words "mechanism," "element," "means," and "configuration" are used broadly and are not limited to mechanical or physical embodiments, but may include software routines in conjunction with processors, etc.

FIG. 1 schematically shows a surveillance system according to an exemplary embodiment. Referring to FIG. 1, the surveillance system according to an exemplary embodiment may include a surveillance apparatus 10 and an external apparatus 20.

The surveillance apparatus 10 may determine whether an event has occurred in a surveillance region according to an interrupt that is periodically generated by a timer, and may send an image, which is acquired by the surveillance apparatus 10 when the event occurs, to the external apparatus 20. Also, the surveillance apparatus 10 may detect a corresponding physical quantity according to a physical quantity detection request received from another external apparatus (not shown) and send the detected physical quantity to the other external apparatus. Here, the other external apparatus may be the same as the external apparatus 20, and thus, the descriptions herebelow assume that they are one same external apparatus. The interrupt described herein may be an interrupt signal.

The surveillance apparatus 10 may include a first communicator 110 which transmits or receives data to or from the external apparatus 20 at a first frequency, a second communicator 120 which transmits or receives data to or from the external apparatus 20 at a second frequency lower than the first frequency, a timer 130 configured to periodically generate an interrupt, an image sensor 140 configured to acquire an image, at least one detector 150 configured to measure a physical quantity, and a controller 160 configured to control the first communicator 110 and the second communicator 120 to transmit or receive data to or from the external apparatus 20. Also, the surveillance apparatus 10 may further include a lens 141 configured to collect light so that the image sensor 140 may convert the light into an electric signal and a power supply source 170 configured to supply power to the controller 160.

The surveillance apparatus 10 may transmit or receive two types of data to or from the external apparatus 20. In more detail, the surveillance apparatus 10 may transmit or receive data that does not require a fast communication speed, such as data or information regarding setting of the image sensor 140, and data that requires a fast communication speed, such as image data acquired by the image sensor 140, to or from the external apparatus 20.

If the surveillance apparatus 10 includes only one communicator that is designed to transmit or receive the two types of data based on transmission or reception of image data that needs a fast communication speed, or both the first communicator 110 and the second communicator 120 are designed to transmit or receive the two types of data based on transmission or reception of image data that needs the fast communication speed, a power loss may occur because data that does not need a fast communication speed is also transmitted or received at the fast communication speed.

The surveillance apparatus 10 according to an exemplary embodiment includes two communicators, transmits or receives image data that requires a fast communication speed through the first communicator 110 that communicates at a high frequency (first frequency), and transmits or receives data that does not require a fast communication speed through the second communicator 120 that communicates at a frequency (second frequency) lower than the first frequency. Thus, it is possible to efficiently use power.

The surveillance apparatus 10 may transmit or receive data to or from the external apparatus 20 with only relatively low power consumption by transmitting or receiving data that does not require a fast communication speed, such as data or information regarding settings of the image sensor 140, through the second communicator 120.

The external apparatus 20 may be any suitable apparatus that uses a notebook, a mobile terminal such as a handheld device, a smartphone, and a tablet, a desktop computer, or the like or is directly or indirectly connected to these devices. Also, the external apparatus 20 may be a server included in a computing apparatus that operates the surveillance apparatus 10. At least some elements constituting the server may be implemented as software including at least one of an operating system, an application program module, and other program modules and may be physically stored in various types of well-known memory devices.

The first communicator 110 and the second communicator 120 according to an exemplary embodiment may transmit or receive data to or from the external apparatus 20. In detail, the first communicator 110 may communicate with the external apparatus 20 at the first frequency. The first communicator 110 may quickly transmit a large volume of data at a high bit rate. Since the high bit rate may be achieved by high frequency communication, the first communicator 110 may communicate with the external apparatus 20 in a high-frequency band. For example, the first communicator 110 may transfer an image acquired by the image sensor 140 to the external apparatus 20 using a frequency band with 2.4 GHz or 5.0 GHz of center frequency. That is, the surveillance apparatus 10 may send the image acquired by the image sensor 140 to the external apparatus 20 through the first communicator 110.

When the first communicator 110 does not transmit or receive data to or from the external apparatus 20, the controller 160 may shut off power to the first communicator 110.

Herein, a term "shutting off power" and a term "standby mode" are conceptually different. The term "shutting off" may mean that power supplied to a corresponding element (e.g., the first communicator 110) is physically blocked. The term "standby mode" may mean that a corresponding element operates in a low power consumption mode. In other words, the term "standby mode" may refer to a state in which power is supplied to a corresponding element, that is, a state other than an operating mode.

Herein, a term "supplying power" and a term "operating mode" are also conceptually different. First, as described above, the term "supplying power" may mean that an element that was powered off is physically supplied with power in order to operate the corresponding element. However, the term "operating mode" may mean that an element that was in "standby mode" operates in a normal mode.

The second communicator 120 may communicate with the external apparatus 20 at the second frequency. The second communicator 120 may transmit a small volume of data at a low bit rate using a relatively low frequency, compared to the first communicator 110. For example, the second communicator 120 may communicate with the external apparatus 20 using a frequency band with 868 MHz of center frequency. In this case, the second communicator 120 may also receive data or information regarding setting of the image sensor 140 from the external apparatus 20, and the second communicator 120 may transmit information regarding remaining battery capacity, ambient temperature, ambient humidity, and event occurrence to the external apparatus 20.

When the second communicator 120 receives control information of the surveillance apparatus 10 from the external apparatus 20, the controller 160 may generate an interrupt. The interrupt generated by receiving the control information may temporarily stop a process that is being executed by the controller 160 and control the surveillance apparatus 10 and elements constituting the surveillance apparatus 10 according to the control information received through the second communicator 120. The control method will be described in detail below.

The second communicator 120 may be switched from a standby mode to an operating mode or from the operating mode to the standby mode by a type-3 interrupt generated by a second timer (not shown) distinct from the timer 130, which will be described below. In this case, the second timer (not shown) may periodically generate the type-3 interrupt and determine whether the control information is received from the external apparatus 20. In other words, the second communicator 120 may periodically determine whether the control information is received from the external apparatus 20 and generate a type-2 interrupt on the basis of the reception.

According to another exemplary embodiment, unlike the above-description, the second communicator 120 may always operate in the operating mode. This will be described in detail below.

Meanwhile, a period at which the second timer (not shown) generates an interrupt may be set by a user. For example, when a fast response of a surveillance apparatus to the user is needed, the period at which the second timer (not shown) generates the interrupt may be set to be short. In this case, power consumption may be large.

On the other hand, when a fast response of the surveillance apparatus to the user is not necessary, the period at which the second timer (not shown) generates the interrupt may be set to be long. In this case, power consumption may be reduced.

The timer 130 according to an exemplary embodiment may periodically generate an interrupt. The interrupt generated by the timer 130 may temporarily stop a process that is being executed by the controller 160 so that the controller 160 may perform a process associated with the interrupt generated by the timer 130.

Here, the timer 130 may be a timer counter included in a microprocessor (e.g., an MCU) constituting the controller 160. Furthermore, the interrupt generated by the timer 130 may stop a process being executed according to a certain prescaler ratio of the timer counter of the controller 160, that is, at time intervals each of which is obtained by dividing an operating frequency of the controller 160 by a certain integer so that the controller 160 may perform a process associated with the interrupt. The controller 160 may determine whether an event has occurred in a surveillance region whenever an interrupt is generated by the timer 130 and may send an image, which is acquired by the image sensor 140 when an event has occurred, to the external apparatus 20 through the first communicator 110.

The period at which the timer 130 generates the interrupt may be set by a user. For example, when the surveillance apparatus is installed in a surveillance region that requires strict surveillance, an interrupt generation period may be set to be short so that the controller 160 may frequently determine whether an event has occurred. In this case, power consumption of the surveillance apparatus 10 may be large.

On the other hand, when the surveillance apparatus 10 is installed in a surveillance region that requires weak surveillance, the interrupt generation period may be set to be long so that the controller 160 may determine whether an event has occurred over a long time period, and thus the power consumption of the surveillance apparatus 10 may be reduced.

The image sensor 140 according to an exemplary embodiment may acquire an image of a surveillance region. In detail, the image sensor 140 may image surrounding environments or a scene (space) and capture various objects (e.g., static objects such as a floor, a wall, and an obstacle and dynamic objects such as a person and an animal) in the scene.

The image sensor 140 may include a semiconductor device capable of converting an optical signal into an electric signal (hereinafter referred to as an image), such as a charge-coupled device (CCD) or a complementary metal oxide semiconductor (CMOS). The image created by the image sensor 140 may be sent to the external apparatus 20 through control of the controller 160 or transmission of the first communicator 110.

The controller 160 may supply power to the image sensor 140 or change a mode of the image sensor 140 from a standby (or sleep) mode to an operating mode only when the image sensor 140 captures an image, that is, when an event occurs. In other words, when the surveillance apparatus 10 does not captures an image, the controller 160 may shut off power that is supplied to the image sensor 140.

The detector 150 according to an exemplary embodiment may measure a physical quantity inside or outside the surveillance apparatus 10 and may be provided in plurality. The physical quantity measured by the detector 150 may be sent to the external apparatus 20 through control of the controller 160 or transmission of the second communicator 120.

For example, the detector 150 may be a temperature or humidity measuring unit. In this case, a temperature or humidity measured by the detector 150 may be used to determine whether the surveillance apparatus 10 malfunctions. Also, the measured temperature or humidity may be used by the surveillance apparatus 10 to determine whether an event has occurred. Furthermore, the temperature or humidity may also be used by the external apparatus 20 to check validity of an event occurrence alarm sent by the surveillance apparatus 10.

The detector 150 may be a voltage or current measuring unit. The surveillance apparatus 10 may be driven with a limited energy source such as a battery, and a remaining energy state of the energy source may be important information for operation of the surveillance apparatus 10. That is, the remaining capacity of the battery measured by the detector 150 that is a voltage or current measurement unit may be used by the controller 160 to control operation of the surveillance apparatus 10. Also, the remaining capacity may be sent to the external apparatus 20 through the second communicator 120. However, the above-described examples are merely illustrative, and thus the inventive concept is not limited thereto.

The detector 150 may also be a movement detection unit. The movement detection unit may be a motion sensor, an infrared sensor, an ultrasonic sensor, or a combination thereof. The controller 160 may receive movement detection data from the detector 150 that is a movement detection unit and determine whether an event has occurred on the basis of the received movement detection data.

The controller 160 may supply power to the detector 150 only when it is necessary for the detector 150 to perform detection. In other words, when it is not necessary for the detector 150 to perform detection, the controller 160 may shut off power to the detector 150. According to another exemplary embodiment to be described below, the controller 160 may always supply power to the detector 150.

The controller 160 according to an exemplary embodiment may control transmission or reception of data to or from the external apparatus 20 through the first communicator 110 and the second communicator 120. Also, the controller 160 may control connections among the first communicator 110, the second communicator 120, the image sensor 140, the detector 150, and the power supply source 170 to control power supplied to these elements.

In the related art, when power is applied to the surveillance apparatus 10, power is supplied to all elements thereof. Thus, even when a corresponding element is not required to operate, the element may consume power. For example, when only the image sensor 140, the controller 160, and the first communicator 110 are required to operate in order to send an image acquired by the image sensor 140 to the external apparatus 20, power is also supplied to the detector 150 which is not used in this operation, thus causing unnecessary power consumption.

The controller 160 according to an exemplary embodiment may minimize unnecessary power consumption by supplying or shutting off power to each element constituting the surveillance apparatus 10 as necessary. In detail, the controller 160 may shut off power to an element that is not used in a process being executed. In this case, the shut-off may mean supplying only the minimum power required when a corresponding elements enters a sleep mode or completely stopping supplying power to a corresponding element. The shut-off and supply method will be described in detail later with reference to FIGS. 5 to 12.

The controller 160 may process a type-1 interrupt generated by the timer 130 at a certain time period or a type-2 interrupt generated when the second communicator 120 receives control information from the external apparatus 20. In detail, the controller 160 may detect whether an interrupt is generated and determine a type of the interrupt. In this case, when the generated interrupt is a type-1 interrupt (i.e., the interrupt generated by the timer 130 at a certain time period, the controller 160 may determine whether an event has occurred on the basis of movement detection data received from the detector 150 which is a movement detection unit. When it is determined that an event has occurred, the controller 160 may send an event occurrence alarm to the external apparatus 20 through the second communicator 120, which transmits or receives data at the second frequency. Also, the controller 160 may send an image acquired by the image sensor 140 to the external apparatus 20 through the first communicator 110, which transmits or receives data at the first frequency.

When the generated interrupt is a type-2 interrupt (i.e., an interrupt generated when the second communicator 120 receives control information from the external apparatus 20), the controller 160 may control the surveillance apparatus 10 according to control the information that is received from the external apparatus 20 to generate the type-2 interrupt.

In this case, when setting information of the image sensor 140 is included in the control information that generates the type-2 interrupt, the controller 160 may change settings of the image sensor 140 according to the setting information. That is, the controller 160 may change the settings of the image sensor 140 according to the setting information of the image sensor 140 that is included in the control information received from the external apparatus 20.

As an example, when setting information regarding panning, tilting, and zooming of the image sensor 140 is included in the control information, the controller 160 may drive a driver (not shown) for driving the image sensor 140 according to the setting information regarding panning, tilting, and zooming.

As another example, when a request for status information request of the surveillance apparatus 10 is included in the control information, the controller 160 may send a physical quantity (e.g., temperature, humidity, voltage, etc.) acquired by the detector 150 to the external apparatus 20 through the second communicator 120.

When an interrupt is not detected, the controller 160 may shut off power to the image sensor 140 or set a mode of the image sensor 140 to a standby (or sleep) mode. Furthermore, the controller 160 may also shut off power to the first communicator 110 and the detector 150. When an interrupt is not detected, a power shut-off element in the surveillance apparatus 10 may be determined by a user. For example, when power is shut off to all elements except for essential elements, power consumption may be reduced. However, when each element is required to operate, an operational delay may occur due to booting of the element. When power is shut off to only elements other than some elements that are frequently used, power consumption may increase, and the above-described delay time may be shortened. This will be described in detail below with reference to FIGS. 5 to 12.

The power supply source 170 according to an exemplary embodiment may supply power to the surveillance apparatus 10. The power supply source 170 may be a power source connected to an external power supply source or may be a power source with a limited capacity, such as a battery.

<Interrupt Processing Method>

FIGS. 2 to 4B are diagrams for describing an interrupt processing method performed by the surveillance apparatus 10 (see FIG. 1) according to exemplary embodiments. What has been described with reference to FIG. 1 will not be repeatedly described in detail below.

Figure 2:
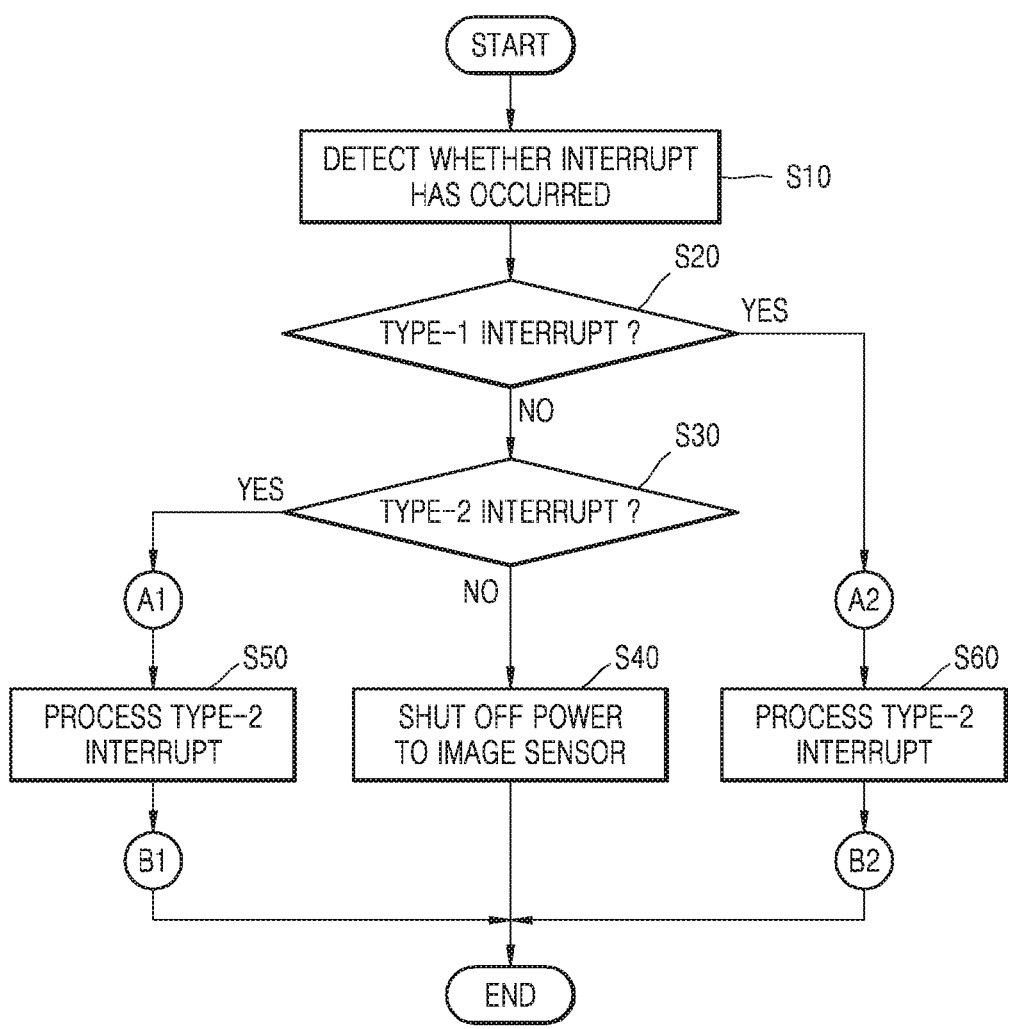
FIG. 2 schematically shows a surveillance method according to an exe exemplary embodiment.

FIG. 2 schematically shows a surveillance method according to an exemplary embodiment.

Referring to FIG. 2, the controller 160 may detect whether an interrupt is generated (S10). In detail, the controller 160 may detect a type-1 interrupt generated by the timer 130 at a certain time period or interval, or detect a type-2 interrupt generated when the second communicator 120 receives control information from the external apparatus 20.

The controller 160 determines whether the detected interrupt is a type-1 interrupt (S20). When the detected interrupt is a type-1 interrupt, the controller 160 may process the interrupt according to a type-1 interrupt processing method (S60). The type-1 interrupt processing method will be described in detail below with reference to FIG. 3.

When the detected interrupt is not a type-1 interrupt, the controller 160 determines whether the detected interrupt is a type-2 interrupt (S30). When the detected interrupt is a type-2 interrupt, the controller 160 may process the interrupt according to a type-2 interrupt processing method (S50). The type-2 interrupt processing method will be described in detail below with reference to FIGS. 4A to 4B.

Meanwhile, when an interrupt is not detected, the controller 160 may shut off power to the image sensor 140 (S40).

In a surveillance method according to another exemplary embodiment, detection of whether an interrupt is generated (S10) and determination of a type of the interrupt (S20, S30) may be performed in one operation. That is, in one operation, a controller 160 according to another exemplary embodiment may determine (1) a state in which a type-1 interrupt is generated, (2) a state in which a type-2 interrupt is generated, or (3) a state in which no interrupt is generated. When the controller 160 determines (1) the state in which a type-1 interrupt is generated and (2) the state in which a type-2 interrupt is generated, the controller 160 may process the interrupts according to the type-1 interrupt processing method (S60) and the type-2 interrupt processing method (S50), respectively, as described above. On the other hand, when the controller 160 determines (3) the state in which no interrupt is generated, the controller 160 may shut off power to the image sensor 140.

Figure 3:
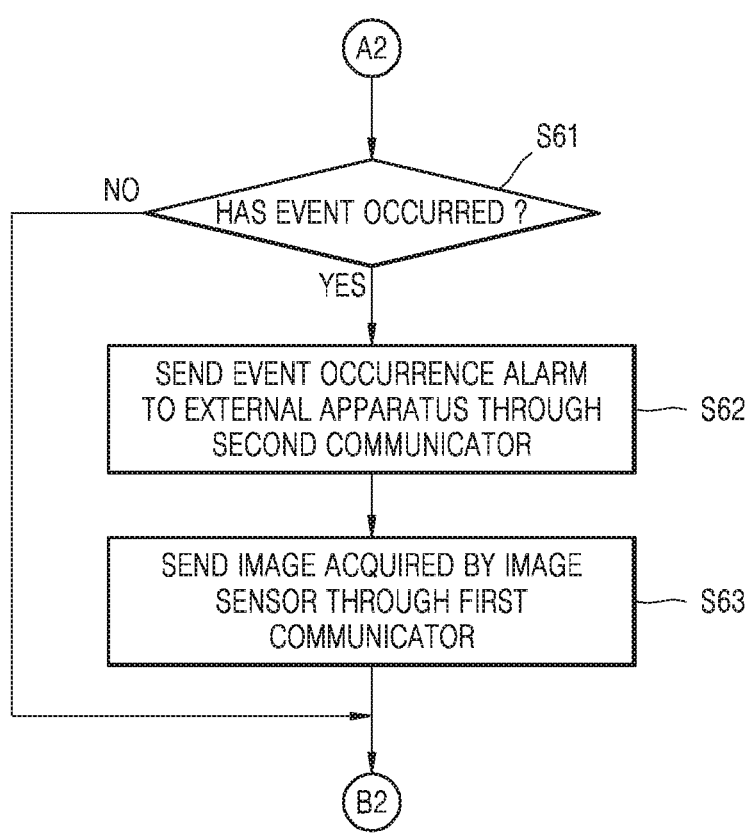
FIG. 3 schematically shows a method in which a controller processes a type-1 interrupt according to an exemplary embodiment.

FIG. 3 schematically shows a method in which the controller 160 processes a type-1 interrupt according to an exemplary embodiment (operation S60 of FIG. 2).

Referring to FIG. 3, when a type-1 interrupt is detected, the controller 160 may detect whether an event has occurred using the detector 150 (S61). For example, the controller 160 may determine whether an event has occurred on the basis of movement detection data received from a movement detector, which is a type of the detector 150. In this case, the movement detector may be a motion sensor, an infrared sensor, an ultrasonic sensor, or a combination thereof.

The controller 160 may temporarily supply power of the power supply source 170 to the detector 150 to detect whether an event has occurred. Here, the temporary power supply may mean that power is supplied to the detector 150 only when the detector 150 is required to detect whether an event has occurred. As described above, the controller 160 may temporarily supply power to the detector 150 and shut off the power when the detector 150 is not required to operate, thus decreasing power consumption.

When the detector 150 determines that an event has occurred, the controller 160 may send an event occurrence alarm to the external apparatus 20 through the second communicator 120, which transmits or receives data at the second frequency (S62). When the alarm is sent to the external apparatus 20, the external apparatus 20 may warn an administrator that the event has occurred.

Also, the controller 160 may send an image acquired by the image sensor 140 to the external apparatus 20 through the first communicator 110, which transmits or receives data at the first frequency (S63). A user may check detailed image information regarding an event occurrence by checking the image sent to the external apparatus 20.

In summary, the controller 160 may control a power source to supply power to the detector 150 and shut off the power to the detector 150 after determining whether an event has occurred and to supply power to the second communicator 120 and the first communicator 110 to send an event occurrence alarm and an image acquired by the image sensor 140 to the external apparatus 20, respectively. It should be appreciated that the controller 160 may shut off the power to the second communicator 120 and the first communicator 110 when the provision of the event occurrence alarm and the image is complete.

Figure 4A:
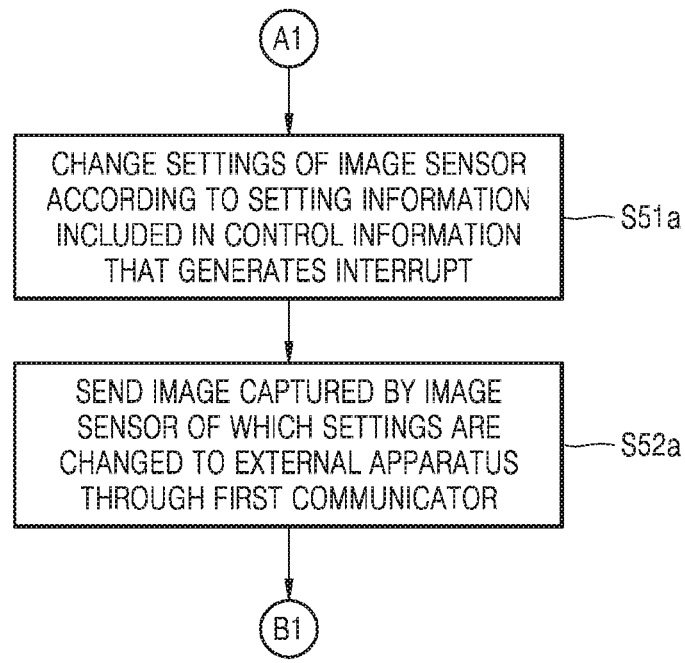
FIG. 4A schematically shows an example in which control information included in a type-2 interrupt contains setting information of an image sensor.
Figure 4B:
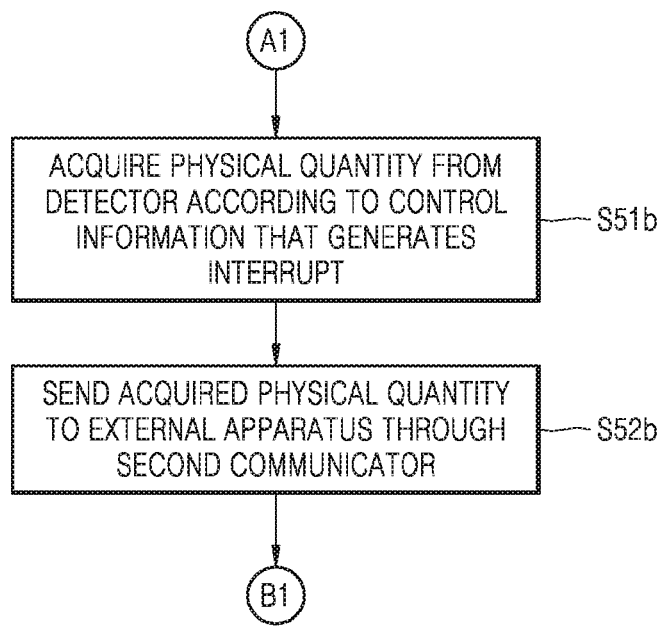
FIG. 4B schematically shows an example in which control information included in a type-2 interrupt contains a request for status information request of a surveillance apparatus.

FIGS. 4A and 4B schematically show a method in which the controller 160 processes a type-2 interrupt according to an exemplary embodiment (operation S50 of FIG. 2).

FIG. 4A schematically shows an example in which control information included in a type-2 interrupt contains setting information of the image sensor 140. When the setting information of the image sensor 140 is included in control information that generates the type-2 interrupt, the controller 160 may change settings of the image sensor 140 according to the setting information (S51*a*). That is, the controller 160 may change the settings of the image sensor 140 according to the setting information of the image sensor 140 that is included in the control information received from the external apparatus 20. As an example, when setting information regarding panning, tilting, and zooming of the image sensor 140 is included in the control information, the controller 160 may drive a driver (not shown) for driving the image sensor 140 according to the setting information regarding panning, tilting, and zooming.

The controller 160 may send an image captured by the image sensor 140 of which settings are changed to the external apparatus 20 through the first communicator 110 (S52*a*). A user may check how well the image sensor 140 is set by checking the image captured by the image sensor 140 of which settings are changed from the external apparatus 20.

In this case, the controller 160 may supply power to the driver (not shown) and the image sensor 140, and shut off the power to the driver (not shown) and the image sensor 140 when the setting is complete.

FIG. 4B schematically shows an example in which control information included in a type-2 interrupt contains a request for status information request of the surveillance apparatus 10 (operation S50 of FIG. 2). When a request for status information of the surveillance apparatus 10 is included in the control information that generates the type-2 interrupt, the controller 160 may acquire a physical quantity measured by the detector 150 from the detector 150 (S51*b*).

In this case, the detector 150 may be, for example, a temperature or humidity measuring unit. In this case, a temperature or humidity measured by the detector 150 may be used to determine whether the surveillance apparatus 10 malfunctions.

Alternatively, the detector 150 may be an element for measuring voltage or current. The surveillance apparatus 10 may be driven as a limited energy source such as a battery, and a remaining energy state of the energy source may be important information for operation of the surveillance apparatus 10.

The controller 160 may send the acquired physical quantity to the external apparatus 20 through the second communicator 120 (S52*b*). The sent physical quantity may be used by the external apparatus 20 to check validity of an event occurrence alarm sent by the surveillance apparatus 10 and check status of the surveillance apparatus 10. In this case, the controller 160 may temporarily supply power to the detector 150 to acquire the physical quantity.

<Power Management Method>

FIGS. 5 to 12 are diagrams for describing a power management method performed by the surveillance apparatus 10 (see FIG. 1) according to exemplary embodiments. What has been described with reference to FIGS. 1 to 4B will not be repeatedly described in detail below.

Figure 5:
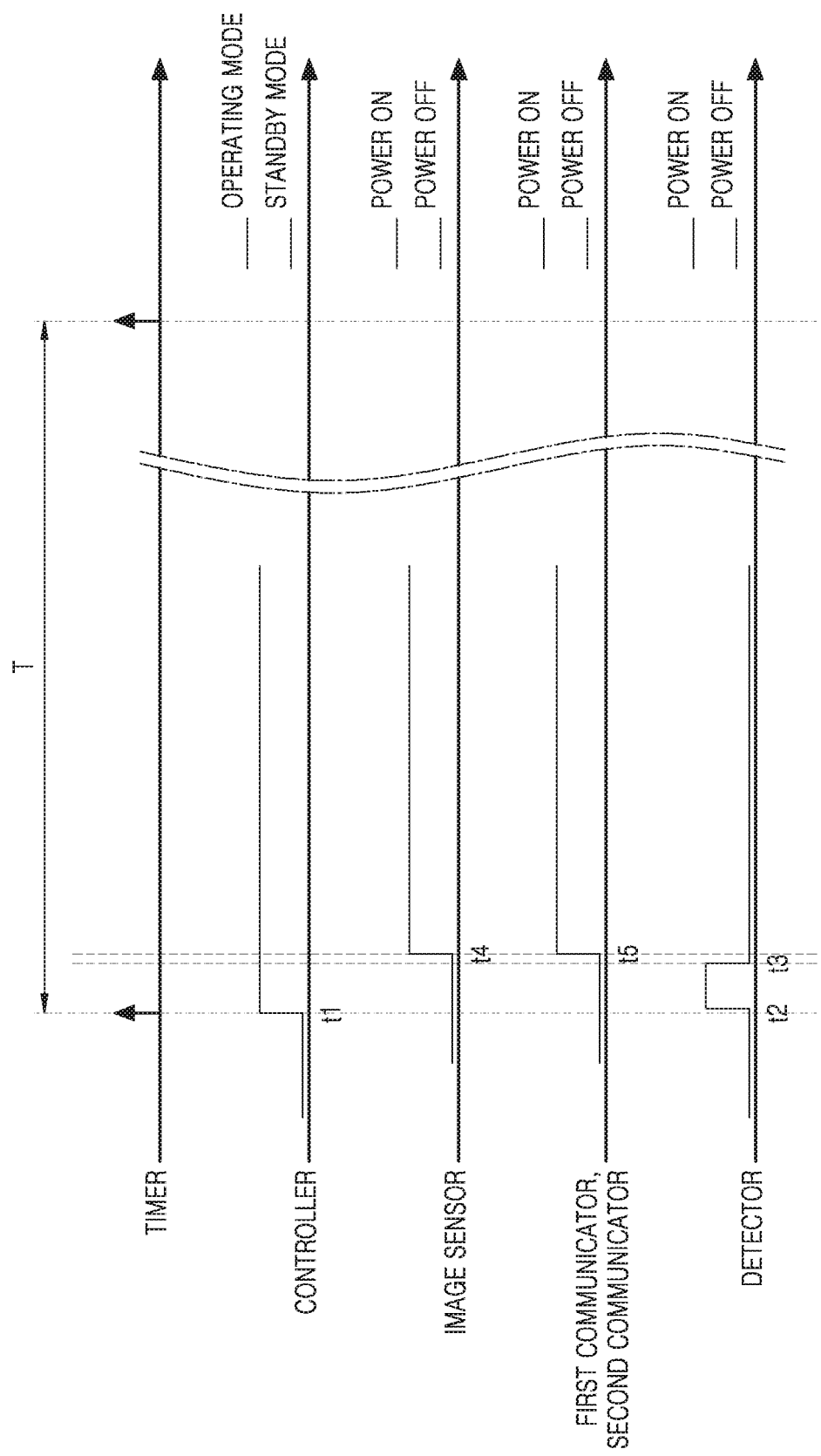
FIG. 5 is a diagram for describing a mode of each element and whether power is supplied to each element over time when a detector detects an event, according to an exemplary embodiment.

FIG. 5 is a diagram for describing a mode of each element and whether power is supplied to each element over time when the detector 150 detects an event.

As described above, it is assumed that the timer 130 generates a type-1 interrupt at a certain time period T.

In this case, as shown in FIG. 5, when a type-1 interrupt is generated by the timer 130 at time t1, the controller 160 may be switched from a standby mode to an operating mode.

The controller 160 may supply power to the detector 150 at time t2 when the controller 160 is switched to the operating mode, and the detector 150 may create movement detection data and send the created movement detection data to the controller 160 when the power is supplied to the detector 150. When the detector 150 completes the creation of the movement detection data, the controller 160 may shut off the power to the detector 150 at time t3.

Next, the controller 160 may determine whether an event has occurred on the basis of the movement detection data received from the detector 150 and may supply power to the image sensor 140 at time t4 and supply power to the first communicator 110 at time t5. It should be appreciated that the controller 160 may switch the second communicator 120 from the standby mode to the operating mode at time t5 as necessary. Meanwhile, time t4 at which the controller 160 supplies power to the image sensor 140 and time t5 at which the controller 160 supplies power to the first communicator 110 may be the same or different from each other. Furthermore, an interval between time t4 and time t5 may be set in consideration of performance of the image sensor 140 and the first communicator 110.

The image sensor 140, the first communicator 110, and the second communicator 120 may send information regarding the event that has occurred to the external apparatus 20 when power is supplied to the image sensor 140, the first communicator 110, and the second communicator 120.

Figure 6:
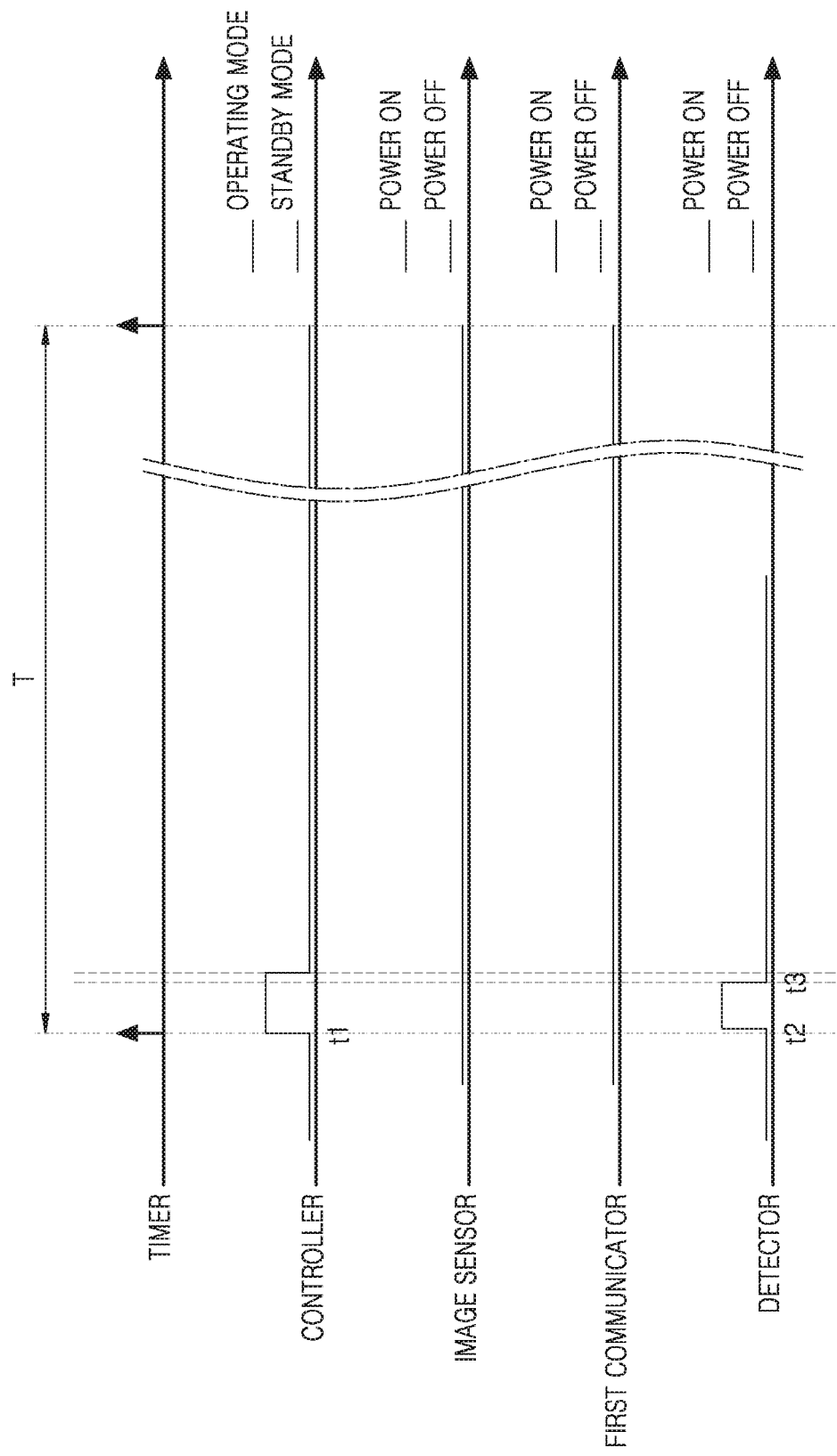
FIG. 6 is a diagram for describing a mode of each element and whether power is supplied to each element over time when a detector does not detect an event, according to an exemplary embodiment.

FIG. 6 is a diagram for describing a mode of each element and whether power is supplied to each element over time when the detector 150 does not detect an event.

As described above, it is assumed that the timer 130 generates a type-1 interrupt at a certain time period T.

In this case, as shown in FIG. 6, when a type-1 interrupt is generated by the timer 130 at time t1, the controller 160 may be switched from the standby mode to the operating mode.

The controller 160 may supply power to the detector 150 at time t2 when the controller 160 is switched to the operating mode, and the detector 150 may create movement detection data and send the created movement detection data to the controller 160 when the power is supplied to the detector 150. When the detector 150 completes the creation of the movement detection data, the controller 160 may shut off the power to the detector 150 at time t3.

Next, the controller 160 may determine whether an event has occurred on the basis of the movement detection data received from the detector 150 and return to the standby mode when it is determined that an event has not occurred.

As described above, according to an exemplary embodiment, it is possible to minimize power consumption of each unit and obtain a long life of the surveillance apparatus 10.

Figure 7:
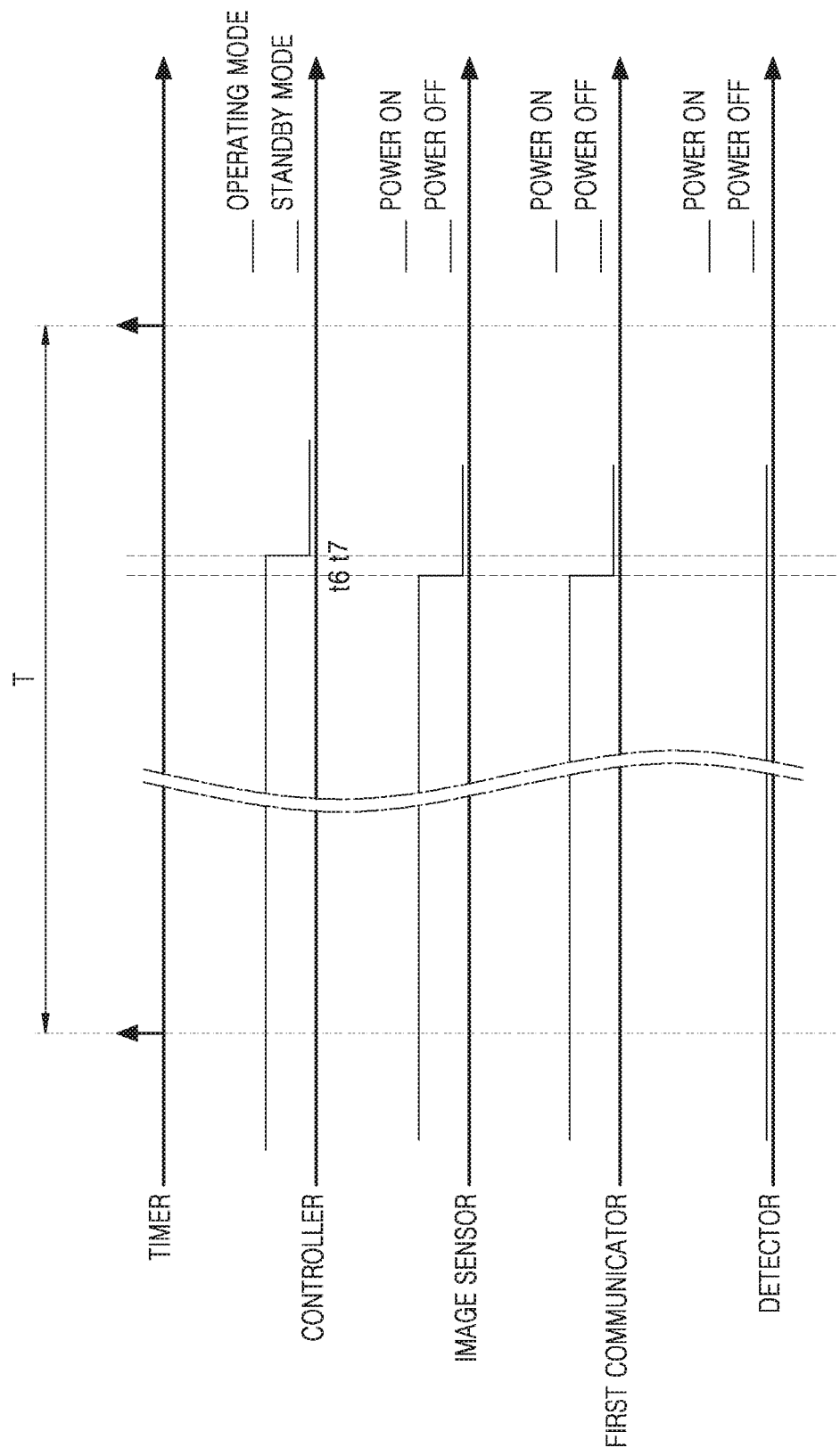
FIG. 7 is a diagram for describing a mode of each element and whether power is supplied to each element over time when a controller completes operations associated with an event that has occurred, according to an exemplary embodiment.

FIG. 7 is a diagram for describing a mode of each element and whether power is supplied to each element over time when the controller 160 completes operations associated with an event that has occurred.

The controller 160 of the surveillance apparatus 10 according to an exemplary embodiment may switch the controller 160 from the operating mode to the standby mode when the surveillance apparatus 10 satisfies a predetermined condition. Here, the predetermined condition may be variously set depending on the configuration of the surveillance apparatus 10. For example, the predetermined condition is a certain time (e.g., 300 sec) passing after the detector 150, which has been described above, detects an event.

For example, when the surveillance apparatus 10 satisfies the predetermined condition at time t6, the controller 160 may shut off power to the image sensor 140 and the first communicator 110 at time t6. Also, the controller 160 may be switched to the standby mode at time t7.

As described above, according to an exemplary embodiment, when the processing of the event is complete, a mode of each element and whether power is supplied to each element may be appropriately changed to efficiently use energy.

Figure 8:
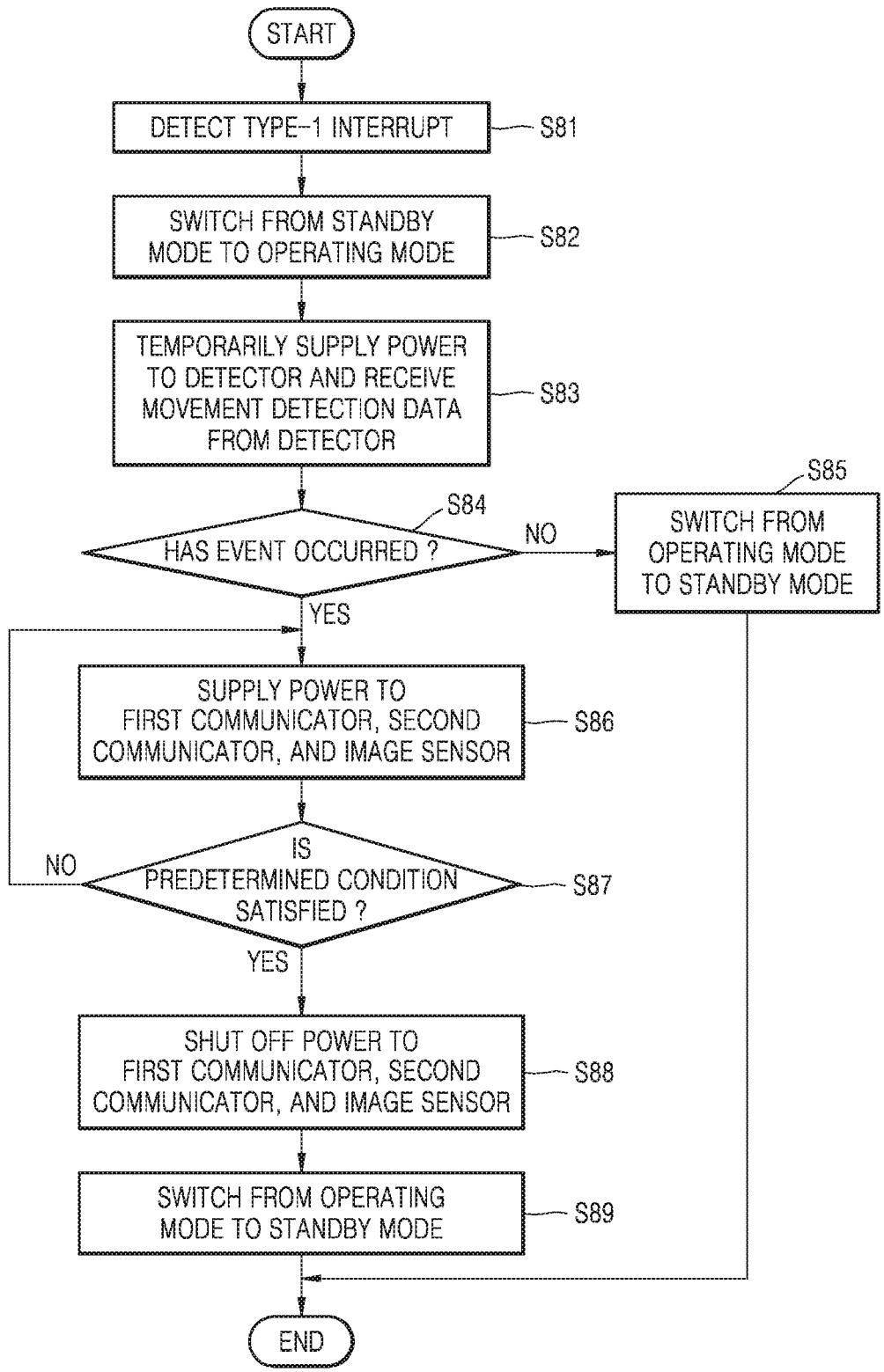
FIG. 8 is a flowchart for describing operation of the controller of FIGS. 5 to 7, according to exemplary embodiments.

FIG. 8 is a flowchart for describing operation of the controller 160 of FIGS. 5 to 7.

When a type-1 interrupt is generated (S81), the controller 160 according to an exemplary embodiment may be switched from a standby mode to an operating mode (S82).

When the controller 160 is switched to the operating mode, the controller 160 may temporarily supply power to the detector 150 and receive movement detection data from the detector 150 (S83). In more detail, the controller 160 may supply power to the detector 150 when the controller 160 is switched to the operating mode, and the detector 150 may create the movement detection data and send the created movement detection data to the controller 160 when the power is supplied to the detector 150. When the detector 150 completes the creation and sending of the movement detection data, the controller 160 may shut off the power to the detector 150.

Next, the controller 160 may determine whether an event has occurred on the basis of the movement detection data received from the detector 150 (S84) and may supply power to the image sensor 140 and supply power to the first communicator 110 when it is determined that an event has occurred (S86). It should be appreciated that the controller 160 may switch the second communicator 120 from a standby mode to an operating mode as necessary. The image sensor 140, the first communicator 110, and the second communicator 120 may send information regarding the event that has occurred to the external apparatus 20 when power is supplied to the image sensor 140, the first communicator 110, and the second communicator 120.

The controller 160 according to an exemplary embodiment determines whether the surveillance apparatus 10 satisfies a predetermined condition (S87) and may shut off the power to the image sensor 140, the first communicator 110, and the second communicator 120 when the surveillance apparatus 10 satisfies the predetermined condition (S88). Also, the controller 160 may be switched to the standby mode (S89).

When it is determined that the event has not occurred in operation S84, which has been described above, the controller 160 may be switched to the standby mode (S85).

As described above, according to an exemplary embodiment, when the processing of the event is complete, a mode of each element and whether power is supplied to each unit may be appropriately changed to efficiently use energy.

Figure 9:
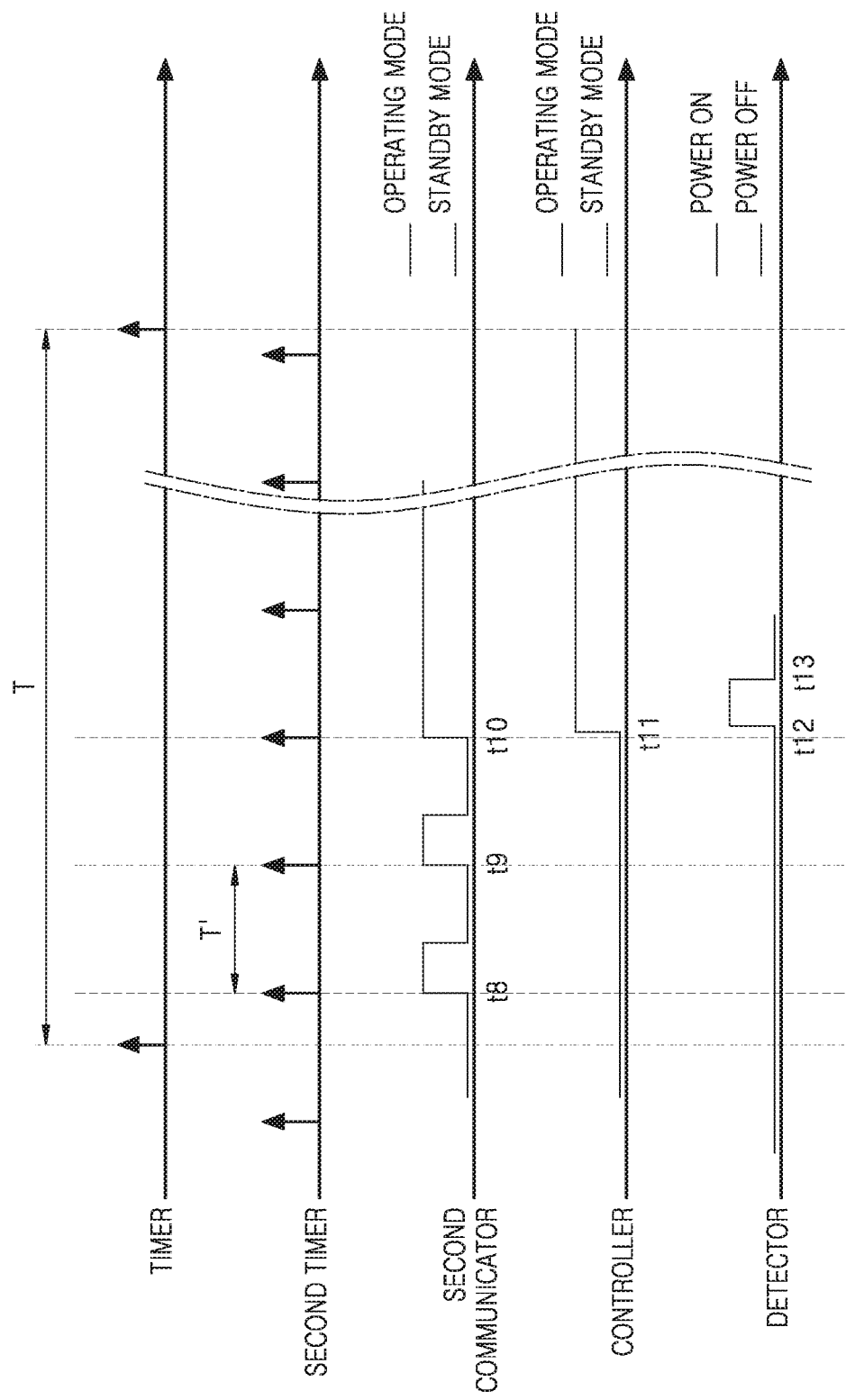
FIG. 9 is a diagram for describing operation of a surveillance apparatus by a second communicator, according to another exemplary embodiment.

FIG. 9 is a diagram for describing operation of the surveillance apparatus 10 by the second communicator 120 according to another exemplary embodiment.

The second communicator 120 according to another exemplary embodiment may be switched from a standby mode to an operating mode or from the operating mode to the standby mode according to a type-3 interrupt. Here, the type-3 interrupt may be an interrupt that is generated at a certain time period T' by a second timer (not shown) different from the above-described timer 130.

The second communicator 120 according to another exemplary embodiment may receive control information from the external apparatus 20 when the second communicator 120 is in the operating mode.

For example, as shown in FIG. 9, it is assumed that the type-3 interrupt has been generated by the second timer (not shown) at time t8, time t9, and time t10 and also that the external apparatus 20 has sent control information to the surveillance apparatus 10 at time t9 and time t10.

Under the above assumptions, when the second communicator 120 is switched from the standby mode to the operating mode at time t10, the second communicator 120 receives a control signal that was transmitted by the external apparatus 20 before time t10. Thus, the controller 160 may be switched to the operating mode at time t11.

When the controller 160 is switched to the operating mode, the controller 160 may perform processing according to the control signal received from the external apparatus 20. In more detail, the controller 160 may determine an element corresponding to the control signal received from the external apparatus 20 and may switch a mode of the determined element or change whether to supply power to the element. In this case, the element may be one of the first communicator 110, the image sensor 140, and the detector 150 of the surveillance apparatus 10.

For example, as described above, when the control signal is "determine whether an event is detected," the controller 160 may supply power to the detector 150 at time t12, and the detector 150 may create movement detection data and send the created movement detection data to the controller 160. Subsequently, when the detector 150 completes the creation and sending of the movement detection data, the controller 160 may shut off the power to the detector 150 at time t13 again.

Thus, according to an exemplary embodiment, it is possible to efficiently respond to the control signal of the external apparatus 20 in terms of energy.

Figure 10:
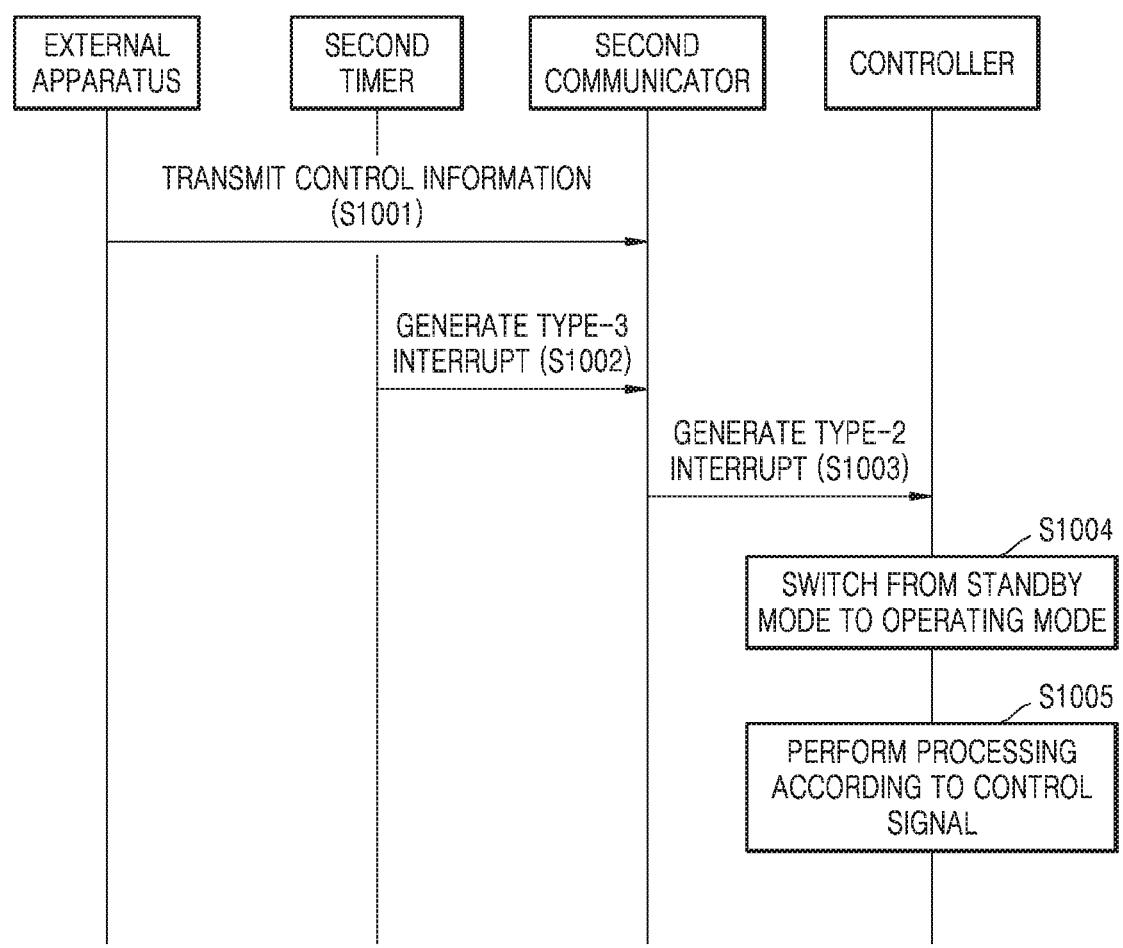
FIG. 10 is a sequence diagram for describing operation of a controller of FIG. 9, according to an exemplary embodiment.

FIG. 10 is a sequence diagram for describing operation of the controller 160 that has been described with reference to FIG. 9.

First, the external apparatus 20 may send control information to the surveillance apparatus 10 according to an exemplary embodiment (S1001).

Next, the second communicator 120 according to another exemplary embodiment may be switched from a standby mode to an operating mode or from the operating mode to the standby mode according to a type-3 interrupt (S1002). Here, the type-3 interrupt may be an interrupt that is generated at a certain time period T' by a second timer (not shown) different from the above-described timer 130.

The second communicator 120 according to another exemplary embodiment may receive the control information from the external apparatus 20 when the second communicator 120 is in the operating mode.

When the second communicator 120 is switched from the standby mode to the operating mode, the second communicator 120 may receive the control information from the external apparatus 20 and generate a type-2 interrupt in response to the received control information (S1003).

The controller 160 according to another exemplary embodiment may be switched from the standby mode to the operating mode by the type-2 interrupt (S1004). Next, the controller 160 may perform processing according to the control signal received from the external apparatus 20 (S1005). For example, as described above, when the control signal is "determine whether an event is detected," the controller 160 may supply power to the detector 150, and the detector 150 may create movement detection data and send the created movement detection data to the controller 160. Subsequently, when the detector 150 completes the creation and sending of the movement detection data, the controller 160 may shut off the power to the detector 150.

Thus, according to an exemplary embodiment, it is possible to efficiently respond to the control signal of the external apparatus 20 in terms of energy.

Figure 11:
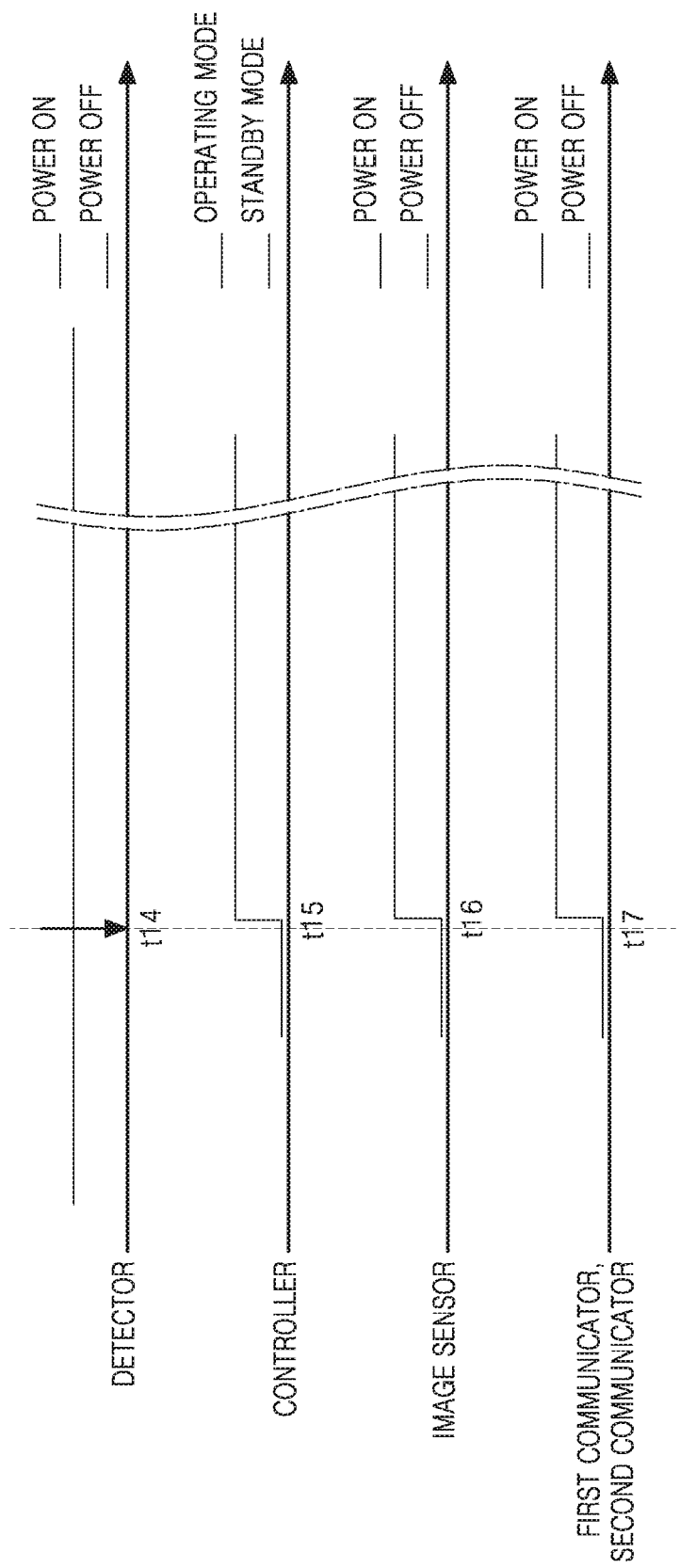
FIG. 11 is a diagram for describing operation of a surveillance apparatus by a detector, according to another exemplary embodiment.

FIG. 11 is a diagram for describing operation of the surveillance apparatus 10 by the detector 150 according to another exemplary embodiment.

In the above-described example, the controller 160 may control supply and shut-off of power to the detector 150 as necessary. However, in this exemplary embodiment, power is always supplied to the detector 150. Accordingly, according to this exemplary embodiment, it is possible to change modes of the controller 160 and other elements, and power is supplied to the controller 160 and the other elements depending on whether the detector 150 detects an event.

To this end, when the detected interrupt is a type-4 interrupt, the controller 160 according to an exemplary embodiment may send an event occurrence alarm to the external apparatus 20 through the second communicator 120. Also, the controller 160 may send an image acquired by the image sensor 140 to the external apparatus 20 through the first communicator 110. Here, the type-4 interrupt may be an interrupt generated by the detector 150 when the detector 150 detects an event.

For example, when an event has occurred at time t14, power is always supplied to the detector 150. Thus, the detector 150 may detect the event instantly, that is, at time t14.

When the event is detected, the detector 150 may switch the controller 160 from a standby mode to an operating mode at time t15.

When the controller 160 is switched to the operating mode, the controller 160 may supply power to the image sensor 140 at time t16 and may supply power to the first communicator 110 at time t17. It should be appreciated that the controller 160 may switch the second communicator 120 from a standby mode to an operating mode at time t17 as necessary. Meanwhile, time t16 at which the controller 160 supplies power to the image sensor 140 and time t17 at which the controller 160 supplies power to the first communicator 110 may be the same or different from each other. Furthermore, an interval between time t16 and time t17 may be set in consideration of performance of the image sensor 140 and the first communicator 110.

When the second communicator 120 is switched to the operating mode, the second communicator 120 may send an event occurrence alarm to the external apparatus 20, as described above. Also, the second communicator 120 may receive transmission request information regarding an image from the external apparatus 20. The controller 160 may send the image to the external apparatus 20 through the first communicator 110 with reference to the received transmission request information.

Thus, according to an exemplary embodiment, it is possible to quickly manage an event occurrence.

Figure 12:
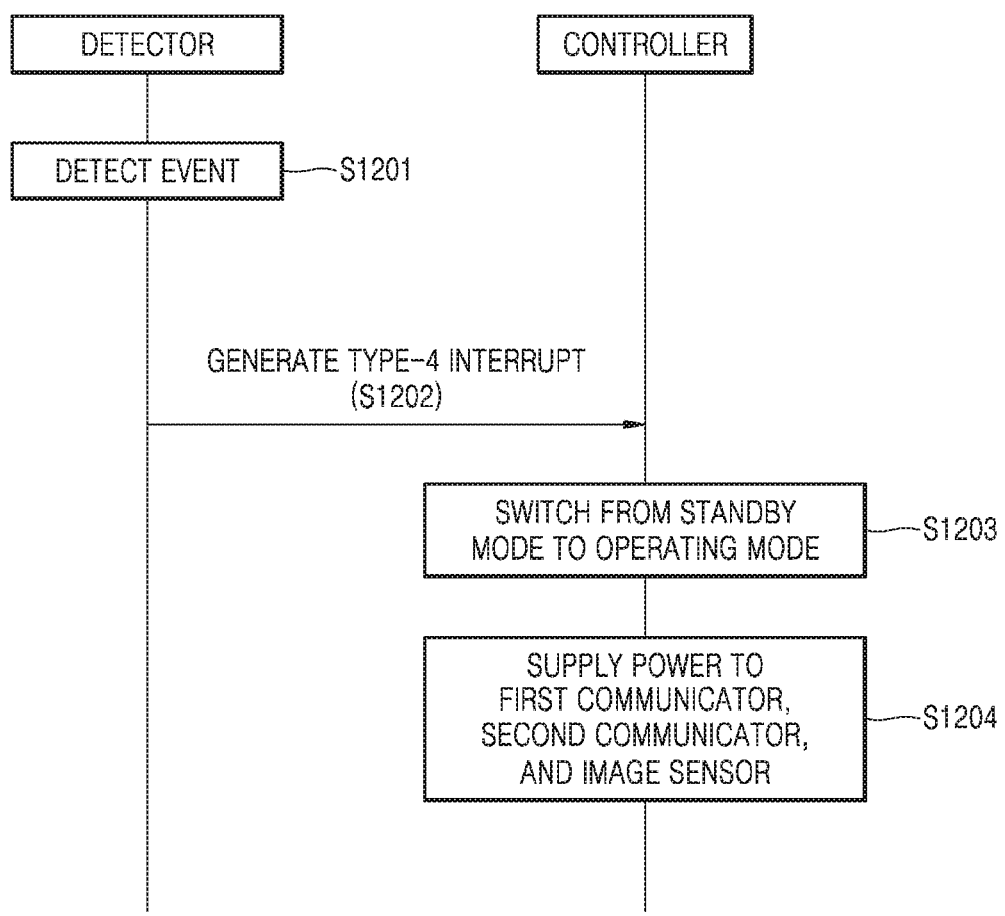
FIG. 12 is a sequence diagram for describing operation of a controller of FIG. 11.

FIG. 12 is a sequence diagram for describing operation of the controller 160 that has been described with reference to FIG. 11.

The detector 150 according to another embodiment may detect an event (S1201). In this case, power may always be supplied to the detector 150.

The detector 150 according to another exemplary embodiment may generate a type-4 interrupt in response to the detected event (S1202).

When the controller 160 detects the type-4 interrupt, the controller 160 according to another exemplary embodiment may be switched from a standby mode to an operating mode (S1203). Next, the controller 160 may supply power to the first communicator 110, the second communicator 120, and the image sensor 140 (S1204). Subsequently, the controller 160 may send an event occurrence alarm to the external apparatus 20 through the second communicator 120. Also, the controller 160 may send an image acquired by the image sensor 140 to the external apparatus 20 through the first communicator 110.

According to embodiments, it is possible to implement a surveillance apparatus capable of efficiently handling power by including a communicator configured to transmit or receive a large volume of data at high speed and a communicator configured to transmit or receive a small volume of data with low power.

It is also possible to implement a surveillance apparatus that may minimize power consumption by temporarily supplying power only to an element associated with a corresponding interrupt when an interrupt is detected.

Figure 13:
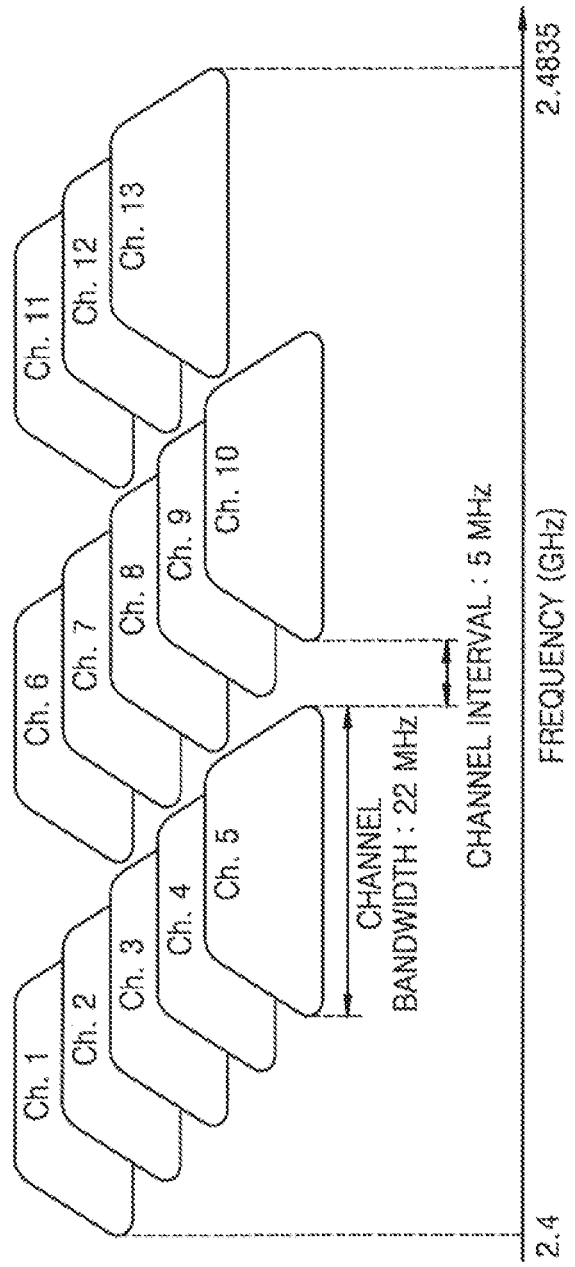
FIG. 13 is a diagram illustrating channels that may be used by a wireless local area network (WLAN) device in a frequency band of Institute of Electrical and Electronics Engineers (IEEE) 802.11 b standard.

FIG. 13 shows channels that may be used by a WLAN device in a frequency band of Institute of Electrical and Electronics Engineers (IEEE) 802.11 b standard. 13 channels may be used in South Korea as illustrated in FIG. 13, and 11 channels may be used in the United States.

Referring to FIG. 13, an available frequency band for WLAN devices ranges from about 2.4 to 2.4835 GHz, and a channel width thereof is about 83.5 MHz. Therefore, if a channel width applied to a non-WLAN device included in a WLAN of 83.5 MHz is about 1 MHz, the non-WLAN device may use 83 channels at maximum. In this case, the non-WLAN device should hop frequency channels periodically while using 15 frequency channels or more.

However, in the same frequency band of 83.5 MHz, a channel interval between channels available to a WLAN device is about 5 MHz, and a width of each channel is about 22 MHz, which is considerably wide. Therefore, in the case where a WLAN device is newly added or a non-operating WLAN device operates again while a non-WLAN device communicates with an external apparatus in this 83.5 MHz frequency band, there is a high probability that a frequency channel used by the non-WLAN device is interfered. That is, there is a high probability that communication of the non-WLAN device does not function temporarily.

Figure 14:
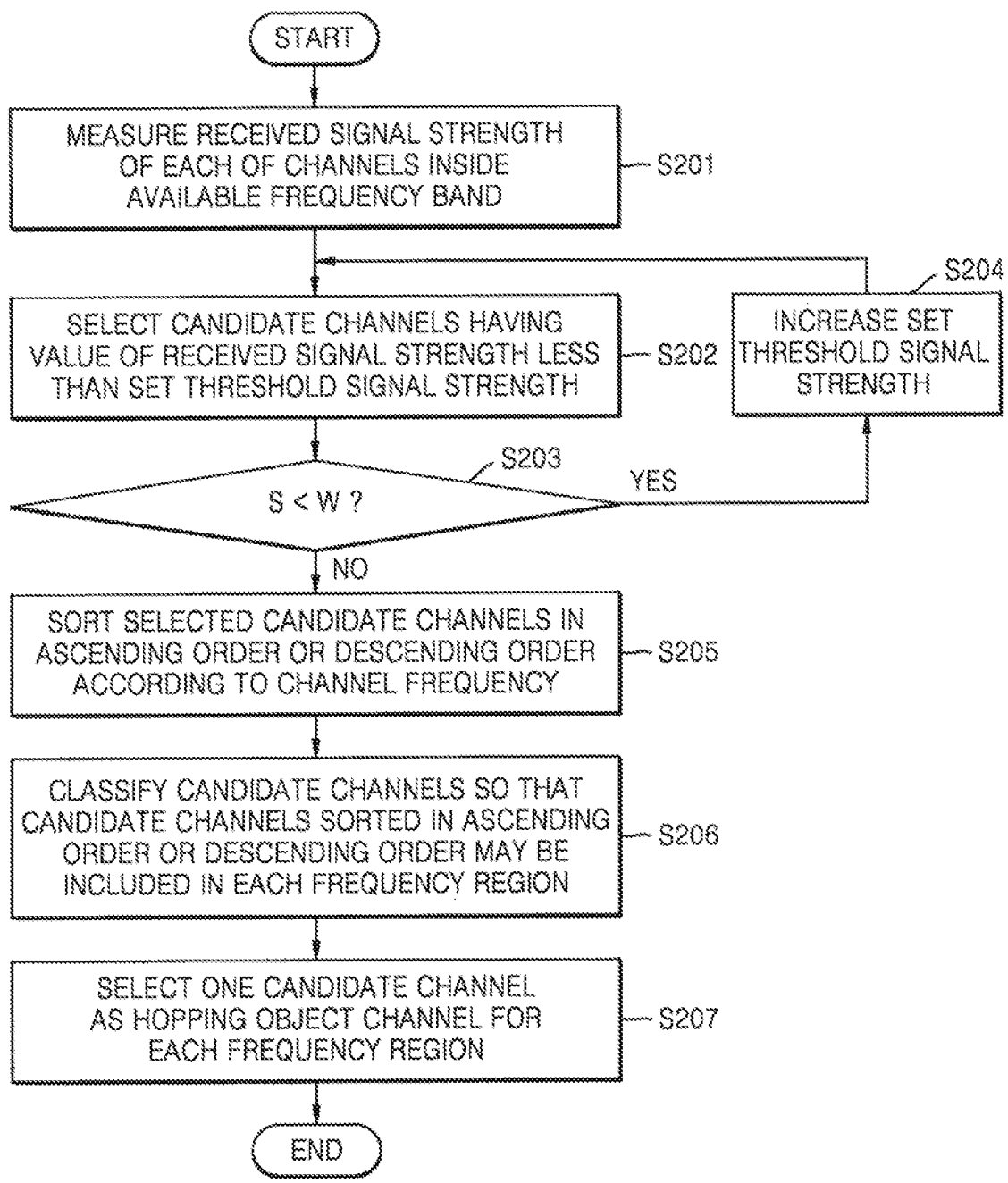
FIG. 14 is a flowchart illustrating a method of selecting hopping object channels at a device except a WLAN device, according to an exemplary embodiment.

FIG. 14 shows a method of selecting hopping target channels in a wireless local area network (WLAN) for a device which is not a WLAN device, according to an exemplary embodiment. The non-WLAN device may be, for example, a monitoring camera that performs wireless communication with a server device or a client terminal.

FIG. 15 is a view for explaining operations S205 to S207 of FIG. 14 by using an example. U in FIG. 15 denotes a set of candidate channels sorted in an ascending order. U1 to U5 denote sets of candidate channels included in each frequency region. Also, H denotes a set of hopping target channels. Here, the channel denotes a frequency band. However, the channel may indicate a single frequency according to an exemplary embodiment.

A method of selecting hopping target channels H is described below with reference to FIGS. 14 and 15.

In operations S201 to S204, a non-WLAN device selects candidate channels having a received signal strength less than a threshold signal strength from among a plurality of channels within an available frequency band. Here, the received signal strength represents a strength of a reception signal measured at the non-WLAN device in each of the plurality of channels. The available frequency band may be a frequency band of a WLAN. For example, the available frequency band may range from about 2.4 to 2.4835 GHz.

In more detail, the non-WLAN device measures a received signal strength with respect to each of channels included in the available frequency band (operation S201).

Subsequently, the non-WLAN device selects candidate channels having a received signal strength less than the threshold signal strength (operation S202).

In this case, when the number S of candidate channels is less than a predetermined number W of channels (operation S203), the non-WLAN device increases the threshold signal strength (S204).

As described above, the candidate channels selected first according to operations S201 to S204 may have a low probability of being interfered compared with other channels.

In operations S205 and S206, the non-WLAN device classifies the candidate channels into a plurality of frequency regions U1 to U5 based on a channel frequency of each of the candidate channels.

Subsequently, the non-WLAN device sorts the candidate channels in ascending order or descending order according to a channel frequency (operation S205). As illustrated in FIG. 15, a set U of candidate channels may be sorted in an ascending order. For example, a channel "3" of a lowest frequency in the set U of the candidate channels may be a first candidate channel, and a channel "47" of a highest frequency in the set U of the candidate channels may be a last candidate channel.

Next, the non-WLAN device classifies the candidate channels in order such that the candidate channels sorted in ascending order or descending order may be included in each of the frequency regions U1 to U5 (operation S206). For example, the channel "3" of the lowest frequency in the set U of the candidate channels may be classified such that the channel "3" may be included in the first frequency region U1, and the channel "47" of the highest frequency in the set U of the candidate channels may be classified such that the channel "47" may be included in the fifth frequency region U5.

The non-WLAN device selects at least one candidate channel as a hopping target channel from each of the frequency regions U1 to U5, thereby forming a set H of hopping target channels (operation S207).

As described above, the candidate channels selected from the frequency regions U1 to U5, respectively, may maintain a maximum frequency interval or frequency difference according to operations S205 to S207. Therefore, in the case where a WLAN device newly or additionally operates while the non-WLAN device communicates with an external apparatus, a probability that the hopping target channels used by the non-WLAN device are interfered may be reduced. That is, a probability that communication of the non-WLAN device does not function temporarily may be reduced.

According to an exemplary embodiment, in setting a set of hopping target channels H according to operation S207, a candidate channel having a lowest value of a received signal strength may be selected as a hopping target channel from each of the frequency regions U1 to U5. Accordingly, a probability that the hopping target channels used by the non-WLAN device are interfered may be reduced even more.

According to another exemplary embodiment, a candidate channel of the lowest frequency in each of the frequency regions U1 to U5 may be selected as the hopping target channels. In this case, a set of the hopping target channels H in FIG. 15 is {3, 11, 27, 35, 45}.

According to still another exemplary embodiment, a candidate channel of an intermediate frequency in each of the frequency regions U1 to U5 may be selected as the hopping target channels. In this case, a set of the hopping target channels H in FIG. 15 is {5, 21, 28, 38, 46}.

According to yet another exemplary embodiment, a candidate channel of the highest frequency in each of the frequency regions U1 to U5 may be selected as the hopping target channels. In this case, a set of the hopping target channels H in FIG. 15 is {9, 24, 31, 41, 47}.

The inventive concept of selecting the hopping target channels is not limited to the above exemplary embodiments. For example, the hopping target channels may be selected such that two most frequency-distant channels from two subsequent or neighboring frequency regions among the frequency regions U1 to U5 are selected as two of the hopping target channels. Also, without classifying the plurality of channels within the available frequency band into the frequency regions U1 to U5 as above, the hopping target channels may be selected from among the plurality of channels such that any two subsequent or neighboring candidate channels are separated by a predetermined frequency difference or more.

Figure 16:
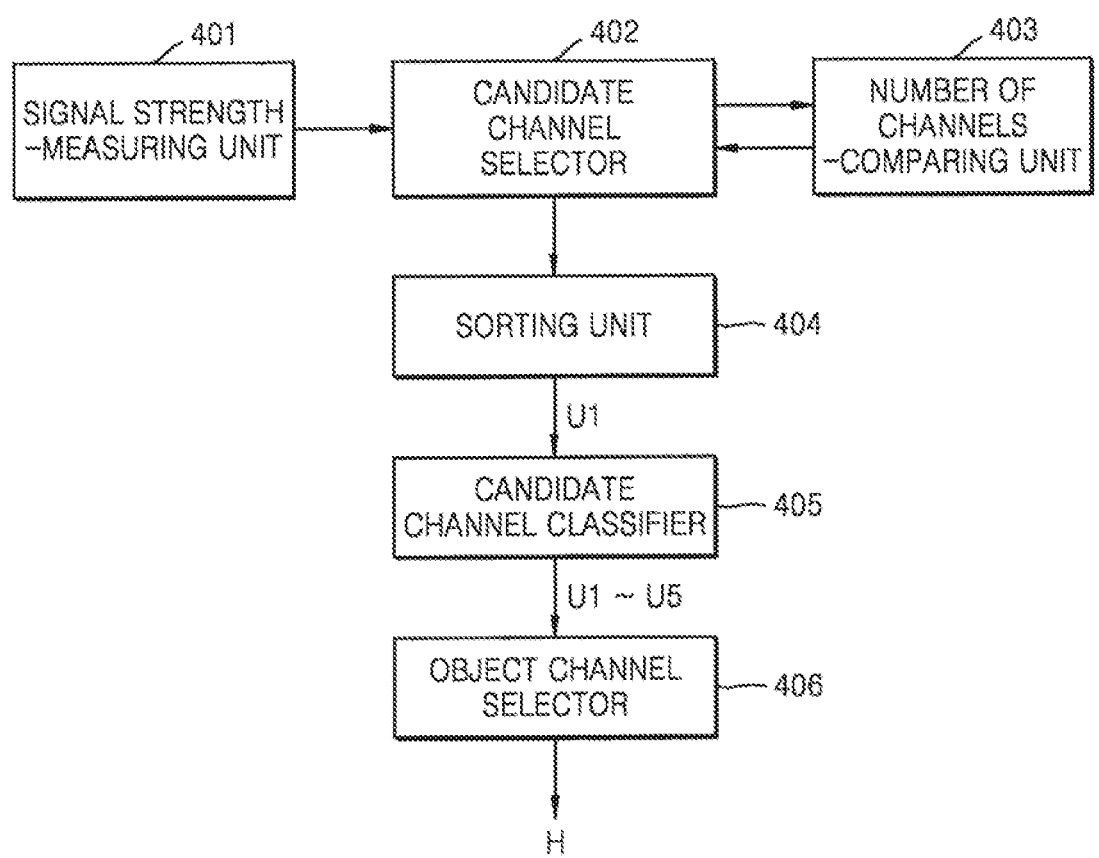
FIG. 16 is a block diagram illustrating a channel-selecting apparatus, according to an exemplary embodiment.

FIG. 16 shows a channel-selecting apparatus which may be included in a non-WLAN device and selecting hopping target channels, according to an exemplary embodiment. The channel-selecting apparatus may be implemented independently from the non-WLAN device. A channel-selecting apparatus according to an exemplary embodiment is described with reference to FIGS. 15 and 16.

The channel-selecting apparatus according to an exemplary embodiment includes a signal strength-measuring unit 401, a candidate channel selector 402, a number of channels-comparing unit 403, a sorting unit 404, a candidate channel classifier 405, and an target channel selector 406.

The signal strength-measuring unit 401 measures a received signal strength of each of channels within an available frequency band of a WLAN.

The candidate channel selector 402 selects candidate channels having a value of a received signal strength less than a threshold signal strength from the channels within the available frequency band, according to a measurement result from the signal strength-measuring unit 401. Therefore, the candidate channels selected first by the candidate channel selector 402 may have a low probability of being interfered compared with other channels.

In this case, the channels-comparing unit 403 determines whether the number of candidate channels selected by the candidate channel selector 402 is less than a predetermined number of channels. When the number of candidate channels is less than the predetermined number of channels, the candidate channel selector 402 increases the threshold signal strength.

The sorting unit 404 sorts the candidate channels in ascending order or descending order according to a channel frequency. As illustrated in FIG. 15, the set U of candidate channels may be sorted in ascending order. For example, the sorting unit 404 may sort the channel "3" of the lowest frequency in the set U of the candidate channels first, and sort the channel "47" of the highest frequency last.

The candidate channel classifier 405 classifies the candidate channels in order such that the candidate channels sorted in ascending order or descending order may be included in each of the frequency regions U1 to U5. For example, the candidate channel classifier 405 may classify the channel "3" of the lowest frequency in the set U of the candidate channels such that the channel "3" may be included in the first frequency region U1, and may classify the channel "47" of the highest frequency in the set U of the candidate channels such that the channel "47" may be included in the fifth frequency region U5.

The target channel selector 406 selects at least one candidate channel as a hopping target channel from each of the frequency regions U1 to U5, thereby forming a set H of hopping target channels. Therefore, the hopping target channels selected by the target channel selector 406 may maintain a maximum frequency interval or frequency difference. Therefore, in the case where a WLAN device newly or additionally operates while a non-WLAN device communicates with an external apparatus, a probability that the hopping target channels used by the non-WLAN device are interfered may be reduced. That is, a probability that communication of the non-WLAN device does not function temporarily may be reduced.

In setting a set H of hopping target channels, the target channel selector 406 according to an exemplary embodiment may select candidate channels having a lowest value of a received signal strength from the frequency regions U1 to U5, respectively, as the hopping target channels. An target channel selector 406 according to another exemplary embodiment may select channels of the lowest frequency from the frequency regions U1 to U5, respectively, as the hopping target channels. In this case, a set of the hopping target channels H in FIG. 15 is {3, 11, 27, 35, 45}.

An target channel selector 406 according to still another exemplary embodiment may select channels of an intermediate frequency from the frequency regions U1 to U5, respectively, as the hopping target channels. In this case, a set of the hopping target channels H in FIG. 15 is {5, 21, 28, 38, 46}.

An target channel selector 406 according to further another exemplary embodiment may select channels of the highest frequency from the frequency regions U1 to U5, respectively, as the hopping target channels. In this case, a set of the hopping target channels H in FIG. 15 is {9, 24, 31, 41, 47}.

Further, the target channel selector 406 may select the hopping target channels such that two most frequency-distant channels from two subsequent or neighboring frequency regions among the frequency regions U1 to U5 are selected as two of the hopping target channels.

As described above, according to a method and an apparatus for selecting hopping target channels in accordance with exemplary embodiments, candidate channels having a value of a received signal strength less than a threshold signal strength are selected first. The candidate channels selected first have a low probability of being interfered compared with other channels.

Also, the candidate channels are classified into each frequency region depending on a channel frequency, and one candidate channel is selected as a hopping target channel from the each frequency region. Therefore, the hopping target channels may maintain a maximum frequency interval or difference. In the case where a WLAN device newly or additionally operates while a non-WLAN device communicates with an external apparatus, a probability that the hopping target channels used by the non-WLAN device are interfered may be reduced. That is, a probability that communication of the non-WLAN device does not function temporarily may be reduced.

The exemplary embodiments described above do not limit the inventive concept thereto. For example, the channel-selecting apparatus of FIG. 15 may not include the candidate channel classifier 405 which is configured to classify the plurality of channels within the available frequency band into the frequency regions U1 to U5 as above. In this case, the candidate channel selector 402 may determine the available frequency band of the WLAN and the plurality of channels within the available frequency band, and the target channel selector 406 may select the hopping target channels from among the plurality of channels such that any two subsequent or neighboring candidate channels are separated by a predetermined frequency difference or more.

At least one of the components, elements, modules or units represented by a block as illustrated in the drawings may be embodied as various numbers of hardware, software and/or firmware structures that execute respective functions described above, according to an exemplary embodiment. For example, at least one of these components, elements, modules or units may use a direct circuit structure, such as a memory, a processor, a logic circuit, a look-up table, etc. that may execute the respective functions through controls of one or more microprocessors or other control apparatuses. Also, at least one of these components, elements, modules or units may be specifically embodied by a module, a program, or a part of code, which contains one or more executable instructions for performing specified logic functions, and executed by one or more microprocessors or other control apparatuses. Also, at least one of these components, elements, modules or units may further include or may be implemented by a processor such as a central processing unit (CPU) that performs the respective functions, a microprocessor, or the like. Two or more of these components, elements, modules or units may be combined into one single component, element, module or unit which performs all operations or functions of the combined two or more components, elements, modules or units. Also, at least part of functions of at least one of these components, elements, modules or units may be performed by another of these components, elements, modules or units. Further, although a bus is not illustrated in the above block diagrams, communication between the components, elements, modules or units may be performed through the bus. Functional aspects of the above exemplary embodiments may be implemented in algorithms that execute on one or more processors. Furthermore, the components, elements, modules or units represented by a block or processing steps may employ any number of related art techniques for electronics configuration, signal processing and/or control, data processing and the like.

While this inventive concept has been particularly shown and described with reference to exemplary embodiments thereof, it will be understood by those skilled in the art that various changes in form and details may be made therein without departing from the spirit and scope of the inventive concept as defined by the appended claims. For example, the inventive concept is not limited to only a WLAN and a non-WLAN device operating in the WLAN, and instead, the inventive concept may apply to a different network and a device which is disposed in this network but does not or is not allowed to use this network.

The exemplary embodiments should be considered in descriptive sense only and not for purposes of limitation. Therefore, the scope of the inventive concept is defined not by the detailed description of the inventive concept but by the appended claims, and all differences within the scope will be construed as being included in the inventive concept.

What is claimed is:

1. A surveillance method performed by a surveillance apparatus, the surveillance method comprising:
    determining whether an event has occurred based on detection data;
    in response to determining that the event has occurred based on the detection data,
        switching a power-off state of a second communicator hardware to a power-on state,
        transmitting a first wireless communication to an outside of the surveillance apparatus by using the second communicator hardware, of which a power state is switched, at a second frequency, and
        switching a power-off state of a first communicator hardware to a power-on state; and
        transmitting a second wireless communication, corresponding to the event, to the outside by using the first communicator hardware at a first frequency higher than the second frequency,
    wherein power is completely shut off from the second communicator hardware in the power-off state of the second communicator hardware such that communication with an external apparatus at the second frequency is not possible.

2. The surveillance method of claim 1, wherein the second frequency is of a frequency hopped channel.

3. The surveillance method of claim 2, further comprising:
    selecting a plurality of candidate channels from among a plurality of channels included in an available frequency band of a network; and
    selecting at least one candidate channel as the frequency hopped channel from the plurality of candidate channels.

4. The surveillance method of claim 3, wherein the available frequency band comprises a frequency band of a wireless local area network.

5. The surveillance method of claim 3, wherein the available frequency band comprises a band ranging from about 2.4 GHz to about 2.4835 GHz for a wireless local area network.

6. The surveillance method of claim 1, wherein the first wireless communication is an event occurrence alarm and the second wireless communication is an image, corresponding to the event, acquired by an image sensor.

7. The surveillance method of claim 1, wherein the second wireless communication is transmitted to the outside of the surveillance apparatus after transmission of the first wireless communication.

8. The surveillance method of claim 1, further comprising:
    switching a power-off state of a detector to a power-on state in response to an interrupt; and
    generating the detection data by using the detector.

9. The surveillance method of claim 8, further comprising switching a controller of the surveillance apparatus from a standby mode to an operating mode in response to determining that the event has occurred based on the detection data.

10. The surveillance method of claim 1, wherein the surveillance apparatus is driven by a battery.

11. The surveillance method of claim 1, further comprising:
    switching a power-off state of a detector to a power-on state in response to an interrupt, the detector comprising at least one selected from a temperature measuring device, a humidity measuring device, and a voltage and/or current measuring device; and
    generating the detection data by using the detector.

12. The surveillance method of claim 11, wherein the first wireless communication is an event occurrence alarm, the surveillance method further comprising determining a validity of the event occurrence alarm based on the detection data, the detection data indicating a physical quantity measured by the detector with respect to the surveillance apparatus.

13. A surveillance apparatus comprising:
    a first communicator hardware configured to transmit or receive data to or from an outside of the surveillance apparatus at a first frequency;
    a second communicator hardware configured to transmit or receive data to or from the outside of the surveillance apparatus at a second frequency lower than the first frequency; and
    a controller configured to, in response to determining that an event has occurred based on detection data:
        switch a power-off state of the second communicator hardware to a power-on state,
        transmit a first wireless communication to an outside of the surveillance apparatus by using the second communicator hardware, of which a power state is switched, at the second frequency,
        switch a power-off state of the first communicator hardware to a power-on state; and transmit a second wireless communication, corresponding to the event, to the outside by using the first communicator hardware at the first frequency, wherein power is completely shut off from the second communicator hardware in the power-off state of the second communicator hardware such that communication with an external apparatus at the second frequency is not possible.

14. The surveillance apparatus of claim 13, wherein the second frequency is of a frequency hopped channel.

15. The surveillance apparatus of claim 14, wherein the controller is further configured to:

select a plurality of candidate channels from among a plurality of channels included in an available frequency band of a network; and select at least one candidate channel as the frequency hopped channel from the plurality of candidate channels.

16. The surveillance apparatus of claim 15, wherein the available frequency band comprises a frequency band of a wireless local area network.

17. The surveillance apparatus of claim 15, wherein the available frequency band comprises a band ranging from about 2.4 GHz to about 2.4835 GHz for a wireless local area network.

18. The surveillance apparatus of claim 13, wherein the first wireless communication is an event occurrence alarm and the second wireless communication is an image, corresponding to the event, acquired by an image sensor.

19. The surveillance apparatus of claim 13, wherein the second wireless communication is transmitted to the outside of the surveillance apparatus after transmission of the first wireless communication.

20. The surveillance apparatus of claim 13, further comprising a detector configured to switch from a power-off state to a power-on state in response to an interrupt, and generate the detection data.

21. The surveillance apparatus of claim 20, wherein the controller is further configured to switch from a standby mode to an operating mode in response to determining that the event has occurred based on the detection data.

22. The surveillance apparatus of claim 13, wherein the surveillance apparatus is driven by a battery.

* * * * *